(12) United States Patent
Ringe et al.

(10) Patent No.: US 11,934,334 B2
(45) Date of Patent: Mar. 19, 2024

(54) CCIX PORT MANAGEMENT FOR PCI EXPRESS TRAFFIC

(71) Applicant: Arm Limited, Cambridge (GB)

(72) Inventors: Tushar P Ringe, Austin, TX (US); Mark David Werkheiser, Austin, TX (US); Jamshed Jalal, Austin, TX (US); Sai Kumar Marri, Austin, TX (US); Ashok Kumar Tummala, Cedar Park, TX (US); Rishabh Jain, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/244,182

(22) Filed: Apr. 29, 2021

(65) Prior Publication Data

US 2022/0350771 A1 Nov. 3, 2022

(51) Int. Cl.
*G06F 13/20* (2006.01)
*G06F 13/40* (2006.01)
*G06F 13/42* (2006.01)

(52) U.S. Cl.
CPC ...... *G06F 13/4221* (2013.01); *G06F 13/4068* (2013.01); *G06F 13/4027* (2013.01); *G06F 2213/0026* (2013.01)

(58) Field of Classification Search
CPC ............ G06F 13/4221; G06F 13/4068; G06F 13/4027; G06F 2213/0026
See application file for complete search history.

(56) References Cited

U.S. PATENT DOCUMENTS

| | | | |
|---|---|---|---|
| 9,940,284 B1* | 4/2018 | Davis | G06F 13/4221 |
| 2018/0285282 A1* | 10/2018 | Jakowski | G06F 12/0811 |
| 2019/0042432 A1* | 2/2019 | Khade | G06F 11/3409 |
| 2019/0042455 A1* | 2/2019 | Agarwal | G06F 13/4022 |
| 2020/0303311 A1* | 9/2020 | Young | H01L 25/50 |
| 2021/0174174 A1* | 6/2021 | Zhu | G06N 3/063 |
| 2021/0240655 A1* | 8/2021 | Das Sharma | G06F 13/1626 |

* cited by examiner

*Primary Examiner* — Henry Tsai
*Assistant Examiner* — Kim T Huynh
(74) *Attorney, Agent, or Firm* — Leveque Intellectual Property Law, P.C.

(57) ABSTRACT

The present disclosure advantageously provides a method and system for transferring data over a chip-to-chip interconnect (CCI). At a request node of a coherent interconnect (CHI) of a first chip, receiving at least one peripheral component interface express (PCIe) transaction from a PCIe master device, the PCIe transaction including a stream identifier; selecting a CCI port of the CHI of the first chip based on the stream identifier of the PCIe transaction; and sending the PCIe transaction to the selected CCI port.

20 Claims, 16 Drawing Sheets

CCIX PORT MANAGEMENT FOR PCI EXPRESS TRAFFIC

BACKGROUND

The present disclosure relates to a data processing system. More particularly, the present disclosure relates to a traffic management for a data processing system.

A data processing system may be arranged as a system-on-chip (SoC) that includes various components that are connected by an interconnect. Generally, certain components process data, such as, for example, processors, processor clusters, graphic processors, etc., while other components send data to, and receive data from, the data processing components, such as, for example, memory controllers, input/output (I/O) controllers, etc. The data provisioning components may be connected to on-chip or off-chip memory, data buses, wired or wireless networks, etc. The interconnect provides the network infrastructure over which data transactions between components are conveyed.

The data processing system may also include a number of SoCs that are connected in order to share data between components on different SoCs. Generally, a SoC is referred to as a chip, and the connection between SoCs is known as a chip-to-chip interconnect (CCI), such as a Cache Coherent Interconnect for Accelerators (CCIX). Many data processing situations benefit from connecting multiple chips using a CCIX interface, such as, for example, symmetric multiprocessing (SMP), smart offloading and acceleration, memory expansion, etc. Each chip includes at least one CCIX port with a CCIX link to a CCIX port on another chip. A CCIX link is a logical connection between two CCIX ports. The CCIX ports may be connected using various topologies, such as, for example, direct connections, switches, daisy chains, meshes, etc., to exchange data between the chips of the data processing system.

In order to increase overall throughput of the CCIX interface, the CCIX ports on each chip may be aggregated to distribute traffic, such as memory accesses, across multiple CCIX ports. Traffic is distributed across multiple CCIX ports based on address hashing for normal memory accesses, while a single CCIX port is used for device memory accesses. However, this mode of traffic distribution is not ideal for peripheral component interface express (PCIe) traffic passing over a CCIX link between chips because PCIe ordering is not based on address.

DETAILED DESCRIPTION

Figure 1A:
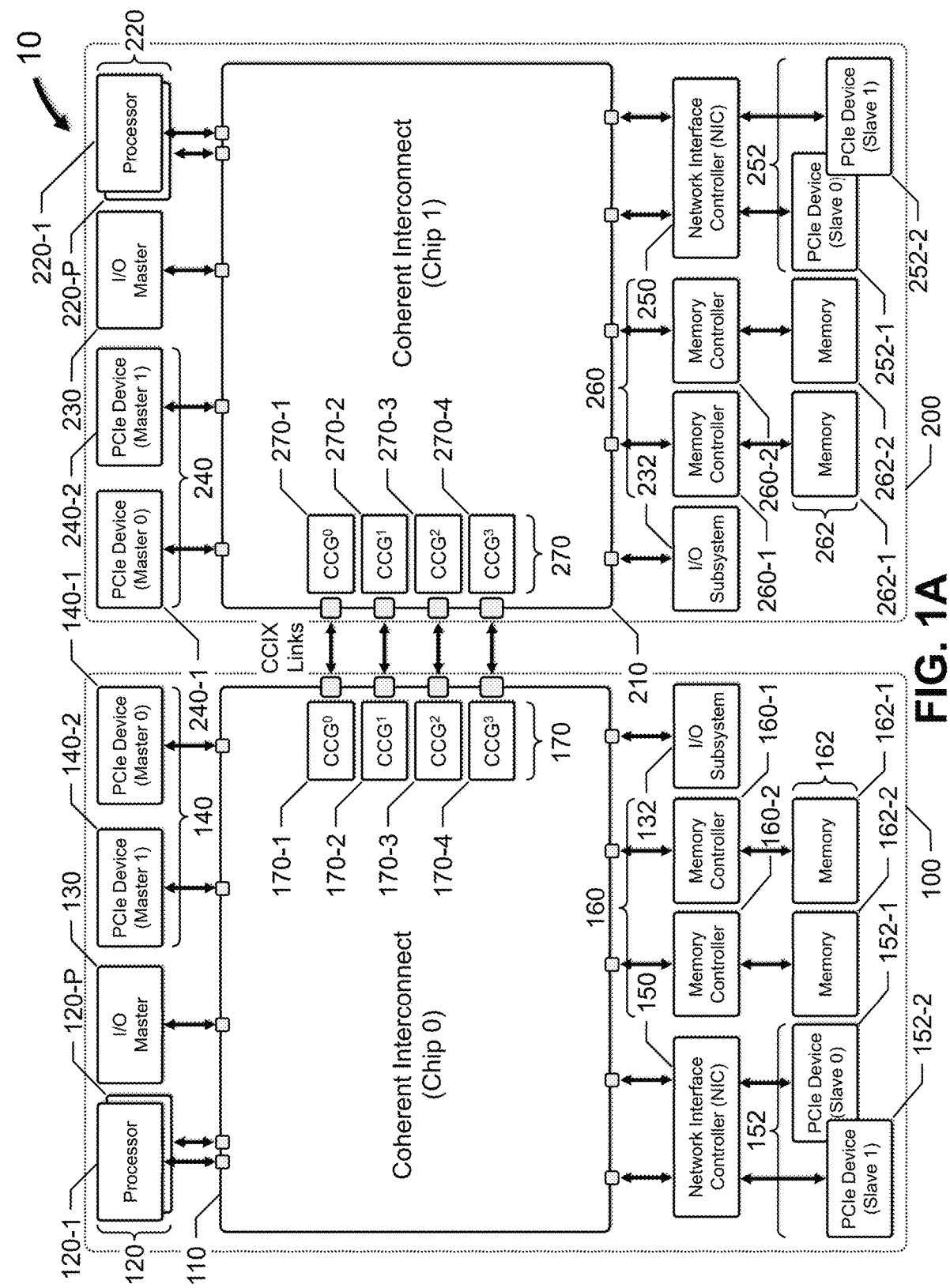
FIG. 1A depicts a block diagram for a system, in accordance with an embodiment of the present disclosure.

Embodiments of the present disclosure will now be described with reference to the drawing figures, in which like reference numerals refer to like parts throughout.

Embodiments of the present disclosure advantageously provide efficient CCIX port management for PCIe traffic by distributing PCIe traffic to different CCIX ports, based on PCIe ordering awareness, so that PCIe ordering rules are maintained at high throughput while maximizing traffic distribution. Embodiments of the present disclosure also provide software-controlled association of different CCIX ports to various PCIe masters, I/O masters (e.g., accelerators, etc.), central processing units (CPUs), etc., so that different CCIX ports can be segregated to improve system bandwidth.

In one embodiment, a method for transferring data over a CCI includes, at a request node of a coherent interconnect (CHI) of a first chip, receiving at least one PCIe transaction from a PCIe master device, the PCIe transaction including a stream identifier; selecting a CCI port of the CHI of the first chip based on the stream identifier of the PCIe transaction; and sending the PCIe transaction to the selected CCI port.

FIG. 1A depicts a block diagram for system 10, in accordance with an embodiment of the present disclosure.

System 10 is a symmetric multiprocessing system that includes two chips that are directly connected by several CCIX links and CCIX port pairs; other embodiments may include additional chips that are connected using direct connections, switches, daisy chains, meshes, etc. Generally, chips 100 and 200 include processors, memory controllers and memories, PCIe devices, network interface controllers (NICs), input/output (I/O) devices, etc.; certain devices may be located off-chip. Each pair of CCIX ports that share a CCIX link are directly connected over a CCIX physical layer, which includes separate transmit and receive channels. Generally, each CCIX port is contained within a CCIX gateway (CCG), as discussed below.

More particularly, chip 100 includes coherent interconnect 110 coupled to one or more processors 120 (e.g., processors 120-1, . . . , 120-P), I/O master device 130, one or more PCIe master devices 140 (e.g., PCIe master devices 140-1, 140-2), NIC 150, one or more memory controllers 160 (e.g., memory controllers 160-1, 160-2), and one or more devices of I/O subsystem 132. Generally, each memory controller 160 is coupled to a respective memory 162, which may be integrated on chip 100 or externally provided. In this embodiment, each memory controller 160-1, 160-2 is coupled to a respective memory 162-1, 162-2. PCIe master devices 140 are directly connected to coherent interconnect 110, while PCIe slave devices 152 are connected to NIC 150. In this embodiment, PCIe master devices 140-1, 140-2 are directly connected to coherent interconnect 110, while PCIe slave devices 152-1, 152-2 are connected to NIC 150. Coherent interconnect 110 includes one or more CCGs 170. In this embodiment, four CCGs 170 are depicted, i.e., CCG 170-1 (i.e., $CCG^0$), CCG 170-2 (i.e., $CCG^1$), CCG 170-2 (i.e., $CCG^3$), and CCG 170-3 (i.e., $CCG^4$); chip 100 may include more or less CCGs 170.

In this embodiment, chip 200 has the same components as chip 100. In other embodiments, chip 200 may have the more or less components, such as additional processors 220, PCIe master devices 240, PCIe slave devices 252, memory controllers 260, memories 262, etc.

More particularly, chip 200 includes coherent interconnect 210 coupled to one or more processors 220 (e.g., processors 220-1, . . . , 220-P), I/O master device 230, one or more PCIe master devices 240 (e.g., PCIe master devices 240-1, 240-2), NIC 250, one or more memory controllers 260 (e.g., memory controllers 260-1, 260-2), and one or more devices of I/O subsystem 232. Generally, each memory controller 260 is coupled to a respective memory 262, which may be integrated on chip 200 or externally provided. In this embodiment, each memory controller 260-1, 260-2 is coupled to a respective memory 262-1, 262-2. PCIe master devices 240 are directly connected to coherent interconnect 210, while PCIe slave devices 252 are connected to NIC 250. In this embodiment, PCIe master devices 240-1, 240-2 are directly connected to coherent interconnect 210, while PCIe slave devices 252-1, 252-2 are connected to NIC 250. Coherent interconnect 210 includes one or more CCGs 270. In this embodiment, four CCGs 270 are depicted, i.e., CCG 270-1 (i.e., $CCG^0$), CCG 270-2 (i.e., $CCG^1$), CCG 270-2 (i.e., $CCG^3$), and CCG 270-3 (i.e., $CCG^4$); chip 200 may include more or less CCGs 270.

The following description of the components of chip 100 also apply to the respective components of chip 200.

Coherent interconnect 110 is a communication system that transfers data among processor 120, I/O master device 130, I/O subsystem 132, PCIe master devices 140, NIC 150 (and PCIe slave devices 152), memory controllers 160 (and memories 162), as well as other components (not depicted). Coherent interconnect 110 also transfers data to, and from, chip 200 through CCGs 170. Coherent interconnect 110 employs a coherent bus protocol that ensures that all processors and master devices see the same view of memory. Certain components of chip 100 may be classified as, associated with, or represented by, a particular type of interconnect protocol node, as discussed in more detail with respect to FIG. 1B.

Generally, coherent interconnect 110 may include, inter alia, a shared or hierarchical bus, a crossbar switch, a packet-based serialized network-on-chip (NoC), etc. In one embodiment, coherent interconnect 110 has a crossbar topology that provides an ordered network with low latency, and may be particularly suitable for a small-sized interconnect with a small number of protocol nodes, switches and wire counts. In another embodiment, coherent interconnect 110 has a ring topology that balances wiring efficiency with latency, which increases linearly with the number of protocol nodes, and may be particularly suitable for a medium-sized interconnect. In a further embodiment, coherent interconnect 110 has a mesh topology that has more wires to provide greater bandwidth, is modular and easily scalable by adding more rows and columns of switches or routers, and may be particularly suitable for a large-sized interconnect.

In many embodiments, coherent interconnect 110 is a coherent mesh network that includes multiple switches or router logic modules (routers) arranged in a two-dimensional rectangular mesh topology, such as, for example, the Arm CoreLink Coherent Mesh Network. In this example, the switches or routers are crosspoints (i.e., XPs). Each XP may connect up to four neighboring XPs using mesh ports, and may connect to one or two components (devices) using device ports. Additionally, each XP may support four CHI channels to transport data from a source device to a destination or target device, as described, for example, in the Arm Advanced Microcontroller Bus Architecture (AMBA) CHI specification.

In these embodiments, coherent interconnect 110 may have an architecture that includes three layers, i.e., an upper protocol layer, a middle network layer, and a lower link layer. The protocol layer generates and processes requests and responses at the protocol nodes, defines the permitted cache state transitions at the protocol nodes that include caches, defines the transaction flows for each request type, and manages the protocol level flow control. The network layer packetizes the protocol message, determines, and adds to the packet, the source and target node identifiers (IDs) required to route the packet over coherent interconnect 110 to the required destination. The link layer provides flow control between components, and manages link channels to provide deadlock free switching across coherent interconnect 110.

Processor 120 may include a single processor core or multiple processor cores, which may be arranged in a processor cluster, such as, for example the Arm Cortex A, R and M families of processors. Processor 120 typically includes local cache memory. At least one processor 120, e.g., processor 120-1, is a general-purpose, central processing unit (CPU) that executes instructions to perform various functions for chip 100, such as, for example, control, computation, input/output, etc. Generally, processor 120-1 executes computer programs or modules, such as an operating system, application software, other software modules, etc., stored within a memory, such as, for example, memory 162.

Other processors 120, e.g., processors 120-2 to 120-P, may be specialized processors that are optimized to perform a specific function, such as process graphics, images and/or multimedia data, process digital signal data, process artificial neural network data, etc. For example, processor 120 may be a graphics processing unit (GPU), a neural processing unit (NPU), a digital signal processor (DSP), etc. More particularly, processor 120 may include a single processor core or multiple processor cores, such as, for example the Arm Mali family of GPUs, display processors and video processors, the Arm Machine Learning processor, etc.

I/O master device 130 is an I/O device that initiates data requests to coherent interconnect 110. I/O master device 130 may be connected to coherent interconnect 110 through an ACE-Lite interface port. I/O subsystem 132 includes one or more I/O devices that may be connected to coherent interconnect 110 through one or more ACE-Lite interface ports.

In one embodiment, PCIe master devices 140 are connected directly to coherent interconnect 110 through an interface port. In other embodiments, PCIe master devices 140 are connected to a system memory management unit (SMMU), which is connected to coherent interconnect 110. The SMMU includes a microprocessor, microcontroller, application specific integrated circuit (ASIC), field programmable gate array (FPGA), etc., and is configured to transmit data to and from various devices, such as PCIe master devices 140, serial advanced technology attachment (SATA) devices, etc. Generally, the SMMU translates an input address into an output address by performing one or more translation table walks.

In certain embodiments, the SMMU is a memory management unit (MMU), such as, for example, the Arm CoreLink MMU family, that includes a translation buffer unit (TBU) and a translation cache unit (TCU), and communicates with various devices using AMBA connections with advanced extensible interface (AXI) and/or AXI Coherency Extensions (ACE) Lite protocols. The SMMU implements a master interface (i.e., a TBU) for each connected master device (e.g., TBU 0 for the master interface of PCIe master device 140-1, TBU 1 for the master interface of PCIe master device 140-2, etc.), and each TBU contains a Translation Look-aside Buffer (TLB) that caches page tables. The TCU controls and manages the address translations. TBU 0 and TBU 1 are independently connected to coherent interconnect 110, and communicate with coherent interconnect 110 using AMBA connections with AXI and/or ACE Lite protocols.

NIC 150 includes a microprocessor, microcontroller, ASIC, FPGA, etc., and is configured to connect various devices, such as, for example, PCIe slave devices 152, etc., using AMBA connections with AXI and/or ACE Lite protocols In certain embodiments, NIC 150 is a network interconnect, such as, for example, the Arm CoreLink NIC family, that includes AMBA interfaces with AXI and/or ACE Lite protocols. NIC 150 is coupled to coherent interconnect 110 using, for example, one or more AMBA connections with AXI and/or ACE Lite protocols.

PCIe slave devices 152 include an AXI slave interface that communicates with NIC 150.

Memory controllers 160 include a microprocessor, microcontroller, ASIC, FPGA, etc., and are configured to provide access to memories 162 through coherent interconnect 110. Memories 162 may include a variety of non-transitory computer-readable medium that may be accessed by the other components of chip 100, such as processor 120, I/O master device 130, PCIe master devices 140, etc. For example, memory 162-1 may store data and instructions for execution by processor 120-1, etc.

In various embodiments, memories 162 may include volatile and nonvolatile medium, non-removable medium and/or removable medium. For example, memories 162 may include any combination of random access memory (RAM), dynamic RAM (DRAM), double data rate (DDR) DRAM or synchronous DRAM (SDRAM), static RAM (SRAM), read only memory (ROM), flash memory, cache memory, and/or any other type of non-transitory computer-readable medium. In certain embodiments, memory controllers 160 are dynamic memory controllers that provide data transfers to and from high-density DDR3 or DDR4 DRAM memory, such as, for example, the Arm CoreLink Dynamic Memory Controller (DMC) family, each of which includes a fast, single-port CHI channel interface for connecting to coherent interconnect 110.

Each CCG 170 includes, inter alia, a CCIX port and a microprocessor, microcontroller, ASIC, FPGA, logic circuits, etc., to provide the functionality for managing data transmission over the CCIX links. It is noted that CCIX protocol advantageously integrates with the PCIe protocol as well as the AMBA CHI, AXI and/or ACE Lite protocols.

Figure 1B:
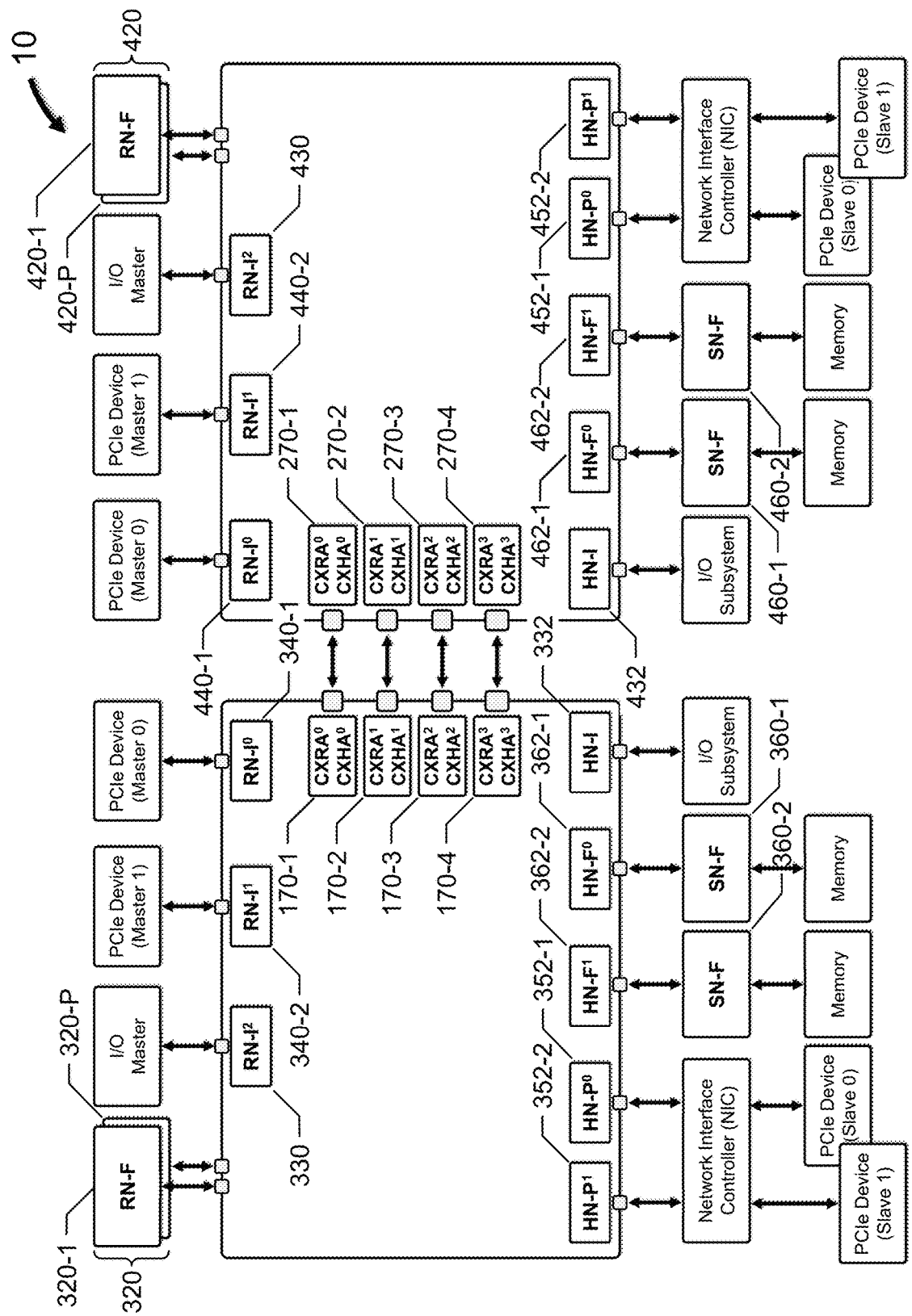
FIG. 1B depicts a block diagram for a system using protocol node nomenclature, in accordance with an embodiment of the present disclosure.

FIG. 1B depicts a block diagram for system 10 using protocol node nomenclature, in accordance with an embodiment of the present disclosure.

A requester is represented by a Request Node (RN), which is a protocol node that generates protocol transactions for coherent interconnect 110, such as, for example, memory reads and writes, I/O data transfers, etc. An RN-F protocol node is a "fully" coherent requester, and an RN-I protocol node represents an "I/O" coherent requester. Processors 120 are fully coherent requesters, so RN-Fs 320 represent processors 120, e.g., RN-F 320-1 represents processor 120-1, RN-F 320-P represents processor 120-P, etc. Each RN-I is associated with a master device that is connected to coherent interconnect 110 or the SMMU, and includes a microprocessor, microcontroller, ASIC, FPGA, logic circuits, etc., to provide the relevant functionality. In some embodiments, RN-Is may use the same hardware. I/O master device 130 is a I/O coherent requester, so RN-I 330 (i.e., RN-I$^2$) is associated with I/O master device 130. PCIe master devices 140 are I/O coherent requesters, and are represented by RN-Is 340, e.g., RN-I 340-1 (i.e., RN-I$^0$) is associated with PCIe master device 140-1, RN-I 340-2 (i.e., RN-I$^1$) is associated with PCIe master device 140-2, etc. If provided, an SMMU may act as a bridge from RN-Is 340 to PCIe master devices 140.

In this embodiment, coherent interconnect 110 includes several completers, each including a microprocessor, microcontroller, ASIC, FPGA, logic circuits, etc., to provide the relevant functionality. Each completer is associated with a Home Node (HN), which is a protocol node that receives protocol transactions from RNs, and may receive protocol transactions from Slave Nodes (SNs), as described below. Each HN is responsible for managing a specific portion of the overall address space for chip 100. Similar to RNs, an HN-F protocol node represents a fully coherent completer, an HN-I protocol node represents an I/O coherent completer, and an HN-P represents a PCIe coherent completer.

Each RN and HN in the system has a system address map (SAM) to determine the target ID of a request. For example, the scope of the SAM might be as simple as providing a fixed node ID value to all the outgoing requests. In many embodiments, the exact format and structure of the SAM is defined by the particular implementation of the system. Generally, the SAM provides a complete decode of the entire address space.

The devices of I/O subsystem 132 are memory-mapped I/O slave devices, so HN-I 332 manages the address spaces for I/O subsystem 132.

PCIe slave devices 152 are memory-mapped I/O slave devices, and are represented by HN-Ps 352. In many embodiments, each HN-P 352 manages the address space for a single PCIe slave device 152, e.g., HN-P 352-1 (i.e., HN-P$^0$) manages the address space for PCIe slave device 152-1, and HN-P 352-2 (i.e., HN-P$^1$) manages the address space for PCIe slave device 152-1. In other embodiments, HN-Ps 352 manage the address space for all of the PCIe slave devices 152, e.g., HN-P 352-1 and HN-P 352-2 manage the address spaces for PCIe slave device 152-1 and PCIe slave device 152-2, which allows each HN-P 352 to send traffic to either PCIe slave device 152 through NIC 150. It is noted that posted write transactions to PCIe slave devices 152 follow Ordered Write Observation (OWO) to maintain PCIe ordering rules.

Each HN-I and HN-P is responsible for managing all of the transactions targeting the address space of a particular memory-mapped slave device or subsystem, and acts as the Point-of-Coherency (PoC) and Point of Serialization (PoS) for the requests sent to that slave device.

In many embodiments, each HN-F 362 manages the address space for one memory 162, e.g., HN-F 362-1 (i.e., HN-F$^0$) manages the address space for memory 162-1, and HN-F 362-2 (i.e., HN-F$^1$) manages the address space for memory 162-1. In other embodiments, HN-Fs 362 manage the address space for all of the memories 162. Each HN-F may include a system level cache and a snoop traffic filter, and acts as the Point-of-Coherency (PoC) and Point of Serialization (PoS) for the memory requests sent to that HN-F. To avoid conflicts when multiple RNs attempt to access the same memory address within memories 162, HN-Fs 362 act as the PoS, processing read requests, write requests, etc., in a serial manner.

A fully coherent slave device may be represented by an SN-F node, which is a protocol node that receives and completes requests from the HN-Fs. Memory controllers 160 are fully coherent slave devices, so SN-Fs 360 represent memory controllers 160, e.g., SN-F 360-1 represents memory controller 160-1, SN-F 360-2 represents memory controller 160-2, etc. In many embodiments, each HN-F 362 is associated with an SN-F 360, e.g., HN-F 362-1 is associated with SN-F 360-1, and HN-F 362-2 is associated with SN-F 360-2.

At the protocol level, each CCG 170 includes a CCIX request agent (CXRA) and a CCIX home agent (CXHA) to manage the data transactions over the CCIX link. The CXRAs receive requests from RNs on chip 100, i.e., RN-Fs 320, RN-I 330 and RN-Is 340, and sends these requests over the CCIX link to the CXHA within the respective CCG 270. The CXHAs receive requests over the CCIX link from the CXRA within the respective CCG 270, and forwards these requests to the appropriate HN on chip 200. The requests include read transactions, write transactions, etc. In this embodiment, CCG 170-1 includes $CXRA^0$ and $CXHA^0$, CCG 170-2 includes $CXRA^1$ and $CXHA^1$, CCG 170-3 includes $CXRA^2$ and $CXHA^2$, and CCG 170-4 includes $CXRA^3$ and $CXHA^3$.

The above description of the protocol components of chip 100 also applies to the respective protocol components of chip 200.

More particularly, RN-Fs 420 represent processors 220, e.g., RN-F 420-1 represents processor 220-1, RN-F 420-P represents processor 220-P, etc. RN-I 430 (i.e., $RN-I^2$) represents I/O master device 230. RN-Is 440 represent PCIe master devices 240, e.g., RN-I 440-1 (i.e., $RN-I^0$) represents PCIe master device 240-1, and RN-I 440-2 (i.e., $RN-I^1$) represents PCIe master device 240-2. If provided, an SMMU may act as a bridge from RN-Is 440 to PCIe master devices 240.

HN-I 432 manages the address spaces for I/O subsystem 232.

Generally, HN-Ps 452 represent PCIe slave devices 252. In many embodiments, each HN-P 452 manages the address space for a single PCIe slave device 252, e.g., HN-P 452-1 (i.e., $HN-P^0$) manages the address space for PCIe slave device 252-1, and HN-P 452-2 (i.e., $HN-P^1$) manages the address space for PCIe slave device 252-1. In other embodiments, HN-Ps 452 manage the address space for all of the PCIe slave devices 252, e.g., HN-P 452-1 and HN-P 452-2 manage the address spaces for PCIe slave device 252-1 and PCIe slave device 252-2, which allows each HN-P 452 to send traffic to either PCIe slave device 252 through NIC 250.

Memory controllers 260 are fully coherent slave devices, so SN-Fs 460 represent memory controllers 260, e.g., SN-F 460-1 represents memory controller 260-1, SN-F 460-2 represents memory controller 260-2, etc. In many embodiments, each HN-F 462 is associated with an SN-F 460, e.g., HN-F 462-1 is associated with SN-F 460-1, and HN-F 462-2 is associated with SN-F 460-2.

At the protocol level, each CCG 270 includes a CCIX request agent (CXRA) and a CCIX home agent (CXHA) to manage the data transactions over the CCIX link. The CXRAs receive requests from RNs on chip 200, i.e., RN-Fs 420, RN-I 430 and RN-Is 440, and sends these requests over the CCIX link to the CXHA within the respective CCG 170.

The CXHAs receive requests over the CCIX link from the CXRA within the respective CCG 170, and forwards these requests to the appropriate HN on chip 200, i.e., HN-Fs 462, HN-I 432 and HN-Ps 450. The requests include read transactions, write transactions, etc. In this embodiment, CCG 270-1 includes $CXRA^0$ and $CXHA^0$, CCG 270-2 includes $CXRA^1$ and $CXHA^1$, CCG 270-3 includes $CXRA^2$ and $CXHA^2$, and CCG 270-4 includes $CXRA^3$ and $CXHA^3$.

In many systems, processors 120 (RN-Fs 320), I/O master device 130 (RN-I 330) and PCIe master devices 140 (RN-Is 340) on chip 100, as well as processors 220 (RN-Fs 420), I/O master device 230 (RN-I 430) and PCIe masters devices 240 (RN-Is 440) on chip 200, use address-based distribution of inter-chip traffic over the CCIX links. In order to achieve higher throughput over the CCIX links, the SAM within each RN on chip 100 includes a list of the available CCG targets, e.g., CCG 170-1 ($CCG^0$), CCG 170-2 ($CCG^1$), CCG 170-3 ($CCG^2$) and CCG 170-4 ($CCG^3$), and the RN determines the target ID by applying a hash function to the incoming address and then selecting the appropriate CCG target based on the hash result. Similarly, the SAM within each RN on chip 200 includes a list of the available CCG targets, e.g., CCG 270-1 ($CCG^0$), CCG 270-2 ($CCG^1$), CCG 270-3 ($CCG^2$) and CCG 270-4 ($CCG^3$), and the RN determines the target ID by applying a hash function to the incoming address, and then selecting the appropriate CCG target based on the hash result.

Figure 2A:
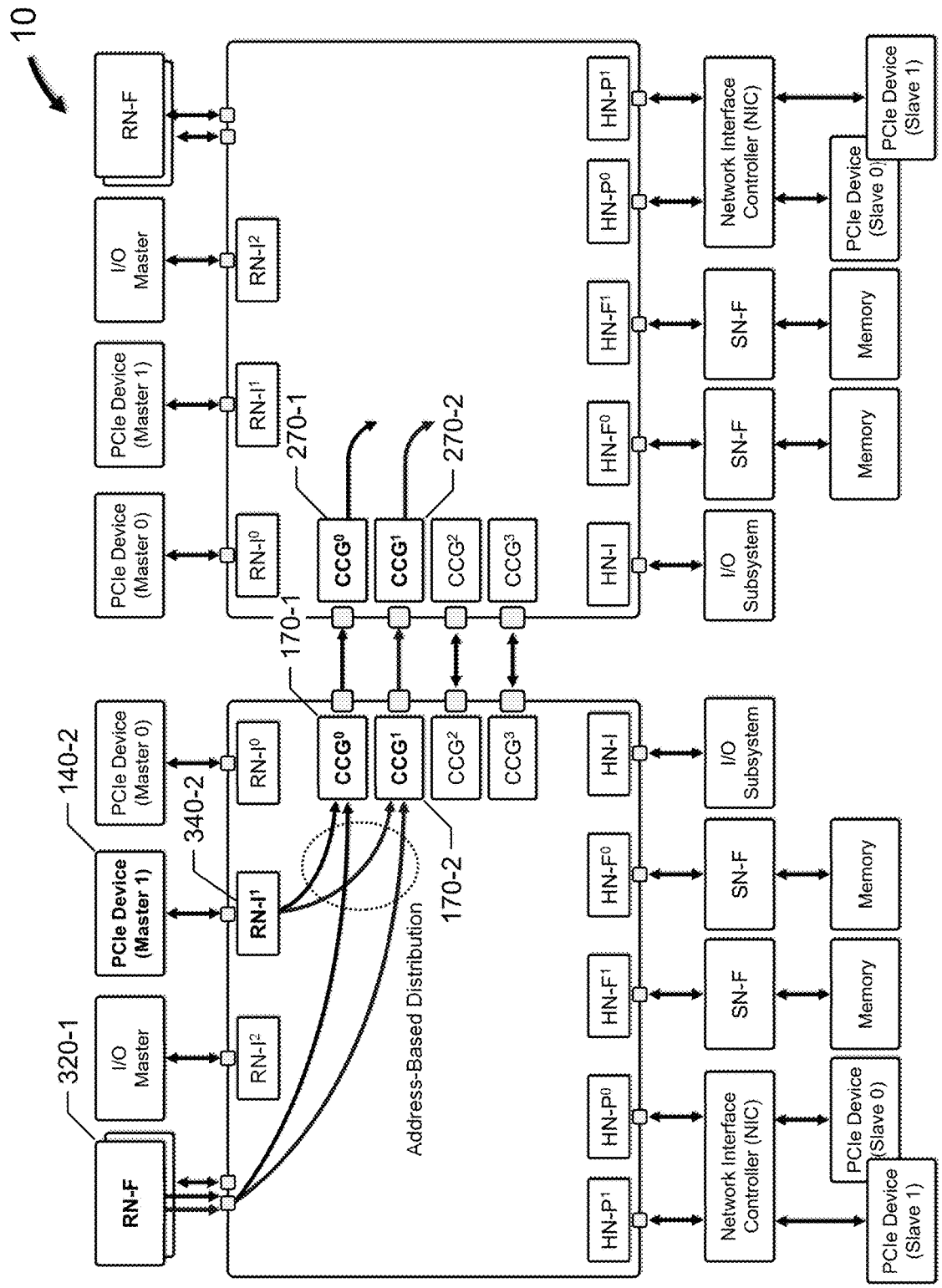
FIG. 2A depicts address-based traffic flow through a system.
Figure 2B:
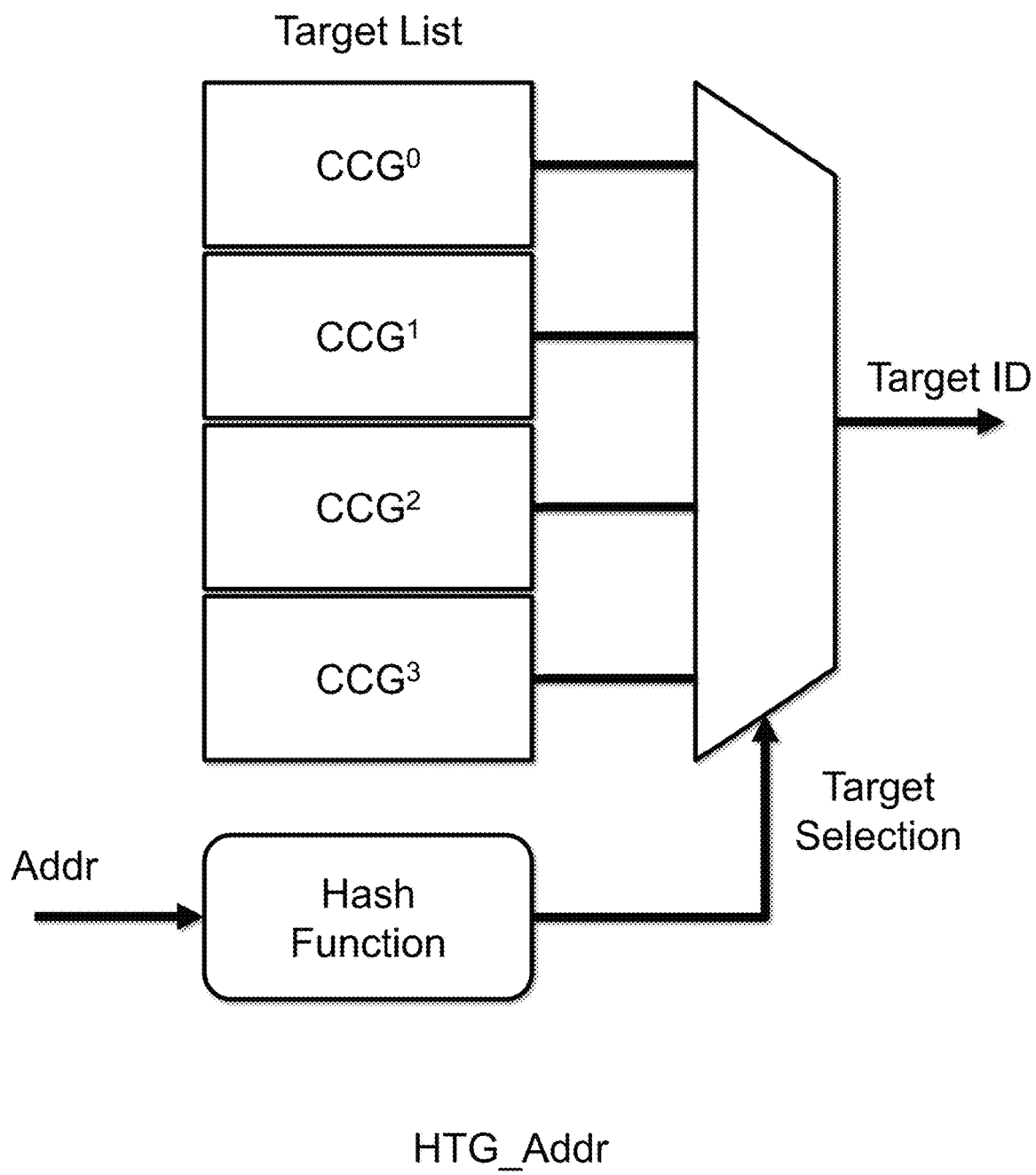
FIG. 2B depicts a block diagram of an address-based target selection process.

FIG. 2A depicts address-based traffic flow through system 10, while FIG. 2B depicts a block diagram of an address-based target selection process 20.

In the example depicted in FIG. 2A, RN-F 320-1 and RN-I 340-2 originate requests for the resources of chip 200. Each request includes an address (i.e., addr). Requests targeted for certain addresses within chip 200 may be routed to CCG 170-1, and then across the CCIX link to CCG 270-1, which routes the requests to the appropriate HN. Similarly, requests targeted for other addresses within chip 200 may be routed to CCG 170-2, and then across the CCIX link to CCG 270-2, which routes the requests to the appropriate HN. While traffic is illustrated as flowing from chip 100 to chip 200, traffic may also flow from chip 200 to chip 100 in a similar manner.

In the example depicted in FIG. 2B, the RN applies a hash function to the address (i.e., addr) of the request, and selects the target ID from a list of the available CCGs 170, i.e., $CCG^0$, $CCG^1$, $CCG^2$ and $CCG^3$. The target ID identifies the particular CCG 170 to which the request is forwarded. In other words, the RN SAM is programmed to include a hashed target group (HTG_Addr) that has a list of CCG targets that are selected based on hashing of the incoming address.

Address-based distribution of inter-chip traffic has several disadvantages. CCIX port selection is not based on bandwidth, so inter-chip traffic can not be tuned to the particular bandwidth requirements of the processors, I/O master devices and PCIe master devices on chips 100 and 200. Additionally, distributing PCIe traffic (e.g., PCIe write transactions and PCIe read transactions) over the CCIX ports based on address produces lower PCIe traffic throughput due to PCIe ordering rules and other constraints.

PCIe ordering rules require that all PCIe write transactions with the same stream identifier, e.g., the same AxId, be ordered. When an RN-I has a SAM that is programmed for address-based distribution, PCIe write transactions originating from a PCIe master device with the same stream identifier (e.g., the same AxId) may be sent to different targets based on the address of the write. In order to maintain ordering, write serialization is required, which reduces throughput. PCIe read transactions typically have a larger data size than PCIe write transactions, such as 256B or 512B, and are sent over the coherent interconnect as a read burst of 4 or 8 cache lines. When an RN-I has a SAM that is programmed for address-based distribution, a PCIe read burst must be divided into cache lines and sent to different CCGs based on the address of the read. This process limits the number of outstanding reads from an RN-I, which reduces throughput due to read latencies in systems within inter-connected chips.

Embodiments of the present disclosure advantageously provide AxId-based distribution of inter-chip PCIe traffic. AxId-based distribution advantageously tunes inter-chip PCIe traffic by controlling the association of PCIe master devices to CCIX ports in order to satisfy the particular bandwidth requirements of the PCIe master devices. AxId-based distribution also advantageously distributes PCIe traffic across CCIX ports with PCIe ordering awareness to produce higher PCIe traffic throughput while achieving better load balancing on the CCIX ports.

A PCIe master device sends PCIe traffic, e.g., PCIe write transactions and PCIe read transactions, to an RN-I over an AXI bus, and the AxId of the transaction identifies the PCIe traffic's ordering stream. Rather than selecting the target Id based on the incoming address of the transaction, the RN-I SAM is advantageously programmed to include an AxId-based hashed target group (HTG_AxId) that has a list of CCG targets that are selected based on hashing of the incoming AxId of the transaction. Transactions with the same AxId are part of same PCIe ordering stream and should pass through same target for better throughput; however, different targets may be selected for transactions with different AxId without ordering impacts.

Figure 3A:
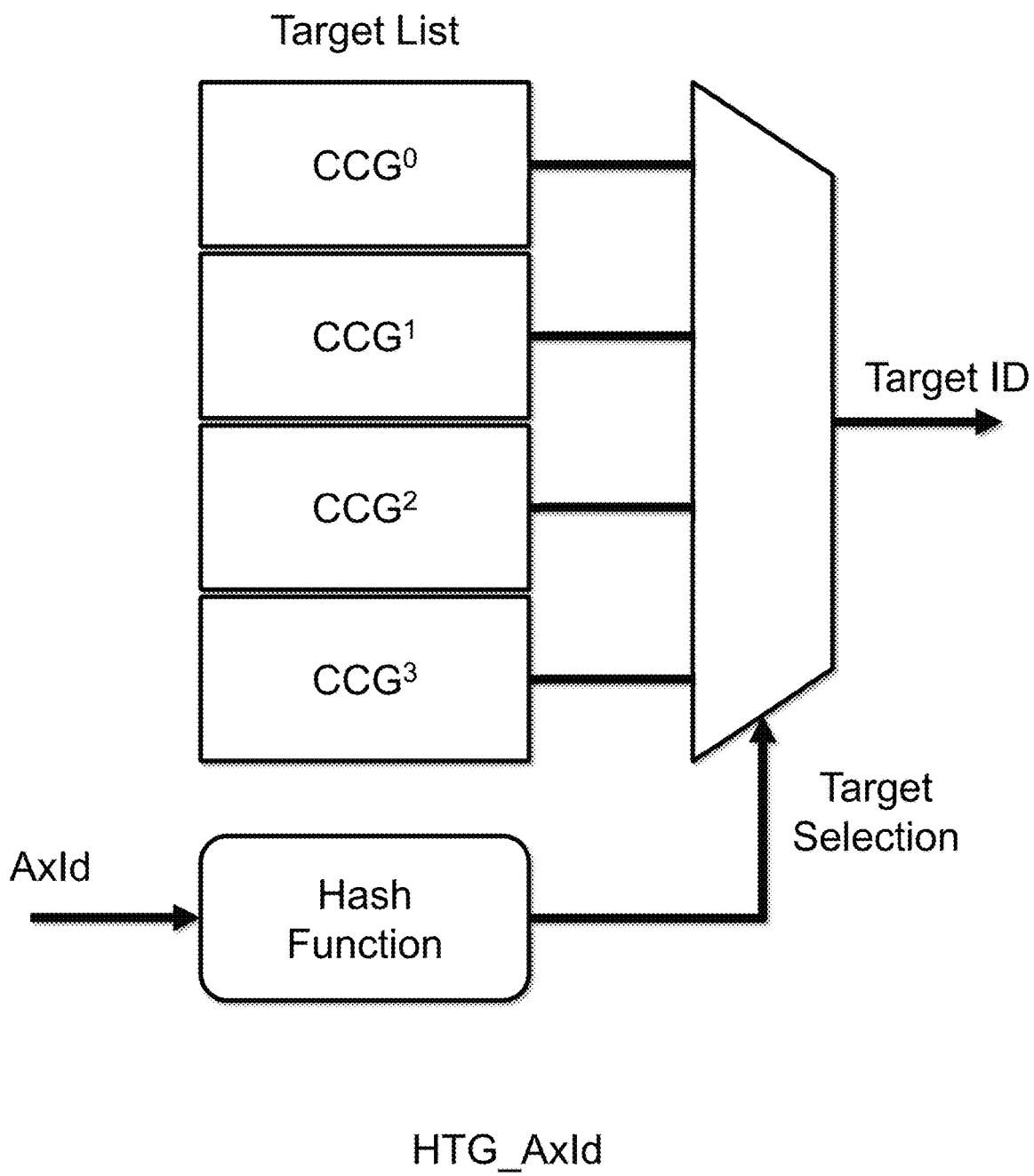
FIG. 3A depicts a block diagram of an AxId-based target selection process, according to an embodiment of the present disclosure.

FIG. 3A depicts a block diagram of an AxId-based target selection process 30, according to an embodiment of the present disclosure.

An AxId-based hashed target group (HTG_AxId) is applicable to both PCIe write transactions and PCIe read transactions. PCIe write transactions may have multiple ordering streams when certain PCIe features are enabled, such as, for example, relaxed order (RO) or ID-based order (IDO). Embodiments of the present disclosure advantageously select the same CCIX target for a particular PCIe write ordering stream while selecting different CCIX targets for different PCIe write ordering streams, thereby providing full throughput for PCIe write transactions while enabling full traffic distribution through the CCIX ports. PCIe read transactions do not have ordering requirements, so each PCIe read transaction includes a different AxId. Embodiments of the present disclosure advantageously select a different target for each PCIe read transaction, thereby distributing PCIe read traffic through the CCIX ports. Advantageously, HTG_AxId accommodates PCIe peer-to-peer traffic between RN-I and HN-Ps to produce better load balancing within the system.

In the example depicted in FIG. 3A, the AxId is provided as the input to the hash function of AxId-based target selection process 30. The hash function outputs a hash value such as, for example, 0, 1, 2 or 3; other output values are also contemplated. The hash value is then used to select a target from the target list, i.e., a hash value of 0 selects $CCG^0$, a hash value of 1 selects $CCG^1$, a hash value of 2 selects $CCG^2$, and a hash value of 3 selects $CCG^3$. The selected $CCG^1$ is output as the target ID.

Figure 3B:
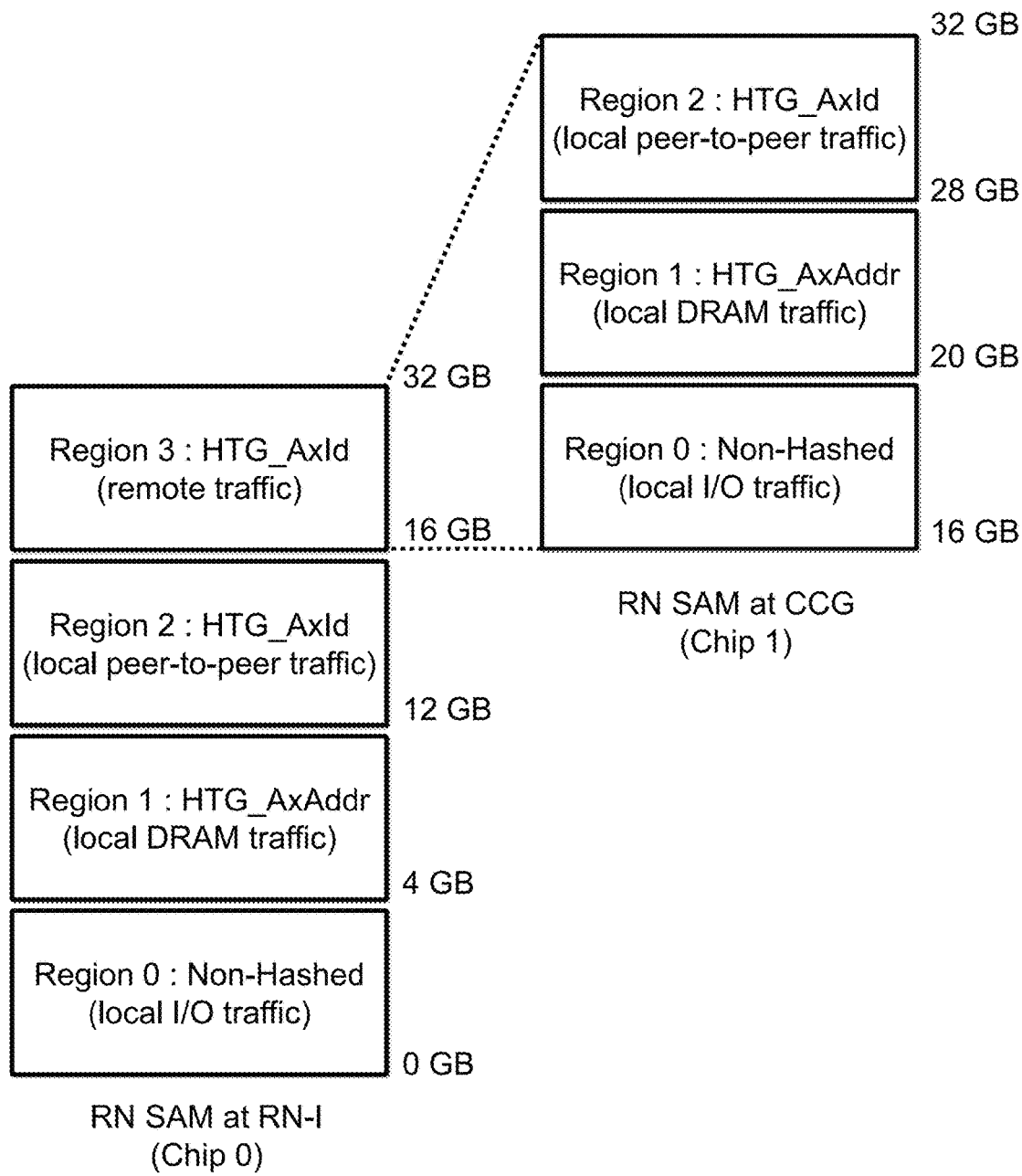
FIG. 3B depicts a system address mapping, in accordance with an embodiment of the present disclosure.

FIG. 3B depicts system address mapping 40, in accordance with an embodiment of the present disclosure.

The RN-I on chip 100 and the CCG nodes on chip 200 are programmed to achieve AxId-based distribution of PCIe traffic. Region 3 in the RN SAM of each RN-I on chip 100 (or chip 200) supports AxId-based traffic distribution for remote traffic so that all the CCGs and CCIX links may be utilized. Further, Region 2 in RN SAM of each CCG on chip 200 (or chip 100) supports AxId-based traffic distribution for PCIe peer-to-peer traffic so that all the HN-Ps may be utilized.

Figure 3C:
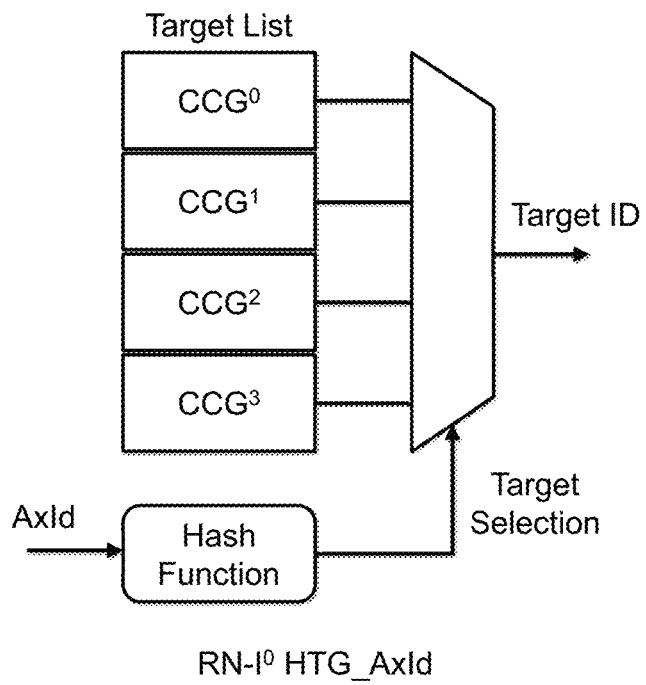
FIG. 3C depicts block diagrams of AxId-based target selection processes, according to an embodiment of the present disclosure.
Figure 3C:
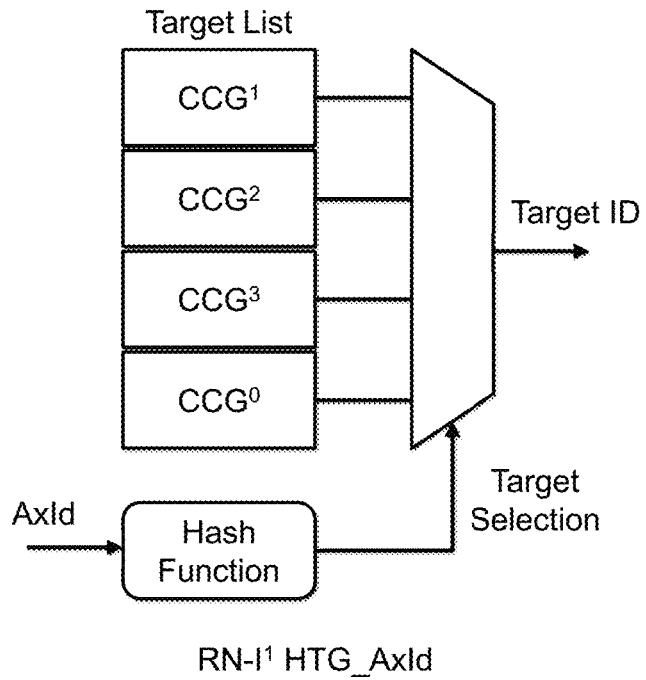

FIG. 3C depicts block diagrams of AxId-based target selection processes 50 and 51, according to an embodiment of the present disclosure.

Generally, PCIe master devices may send simultaneous PCIe traffic with the same AxIds to different RN-Is. However, there is no ordering requirement for PCIe ordering streams with the same AxId that arrive at different RN-Is. In one embodiment, AxId-based target selection process 50 is provided at $RN-I^0$, and AxId-based target selection process 51 is provided at $RN-I^1$; additional RN-Is may also be provided. While the target selection processes are generally the same, the sequence of CCGs in the target lists are different, which ensures that AxId-based target selection processes 50 and 51 select different CCGs when provided with the same AxId as input. In other words, the target list for the RN-Is are scrambled or re-ordered to ensure that PCIe ordering streams with the same AxId are not sent to same target CCG.

With respect to AxId-based target selection process 50, the AxId is provided as the input to the hash function, which outputs a hash value such as, for example, 0, 1, 2 or 3; other output values are also contemplated. The hash value is then used to select a target from the target list, i.e., a hash value of 0 selects $CCG^0$, a hash value of 1 selects $CCG^1$, a hash value of 2 selects $CCG^2$, and a hash value of 3 selects $CCG^3$. The selected $CCG^1$ is output as the target ID. With respect to AxId-based target selection process 51, the AxId is provided as the input to the hash function, which outputs a hash value such as, for example, 0, 1, 2 or 3; other output values are also contemplated. The hash value is then used to select a target from the target list, i.e., a hash value of 0 selects $CCG^1$, a hash value of 1 selects $CCG^2$, a hash value of 2 selects $CCG^3$, and a hash value of 3 selects $CCG^0$. The selected $CCG^1$ is output as the target ID.

When a system includes a single PCIe ordering stream with a single AxId, each PCIe master device will use the same AxId, and their PCIe transactions will be efficiently distributed to different CCGs by RN-Is that employ this embodiment of the AxId-based target selection process.

Figure 4A:
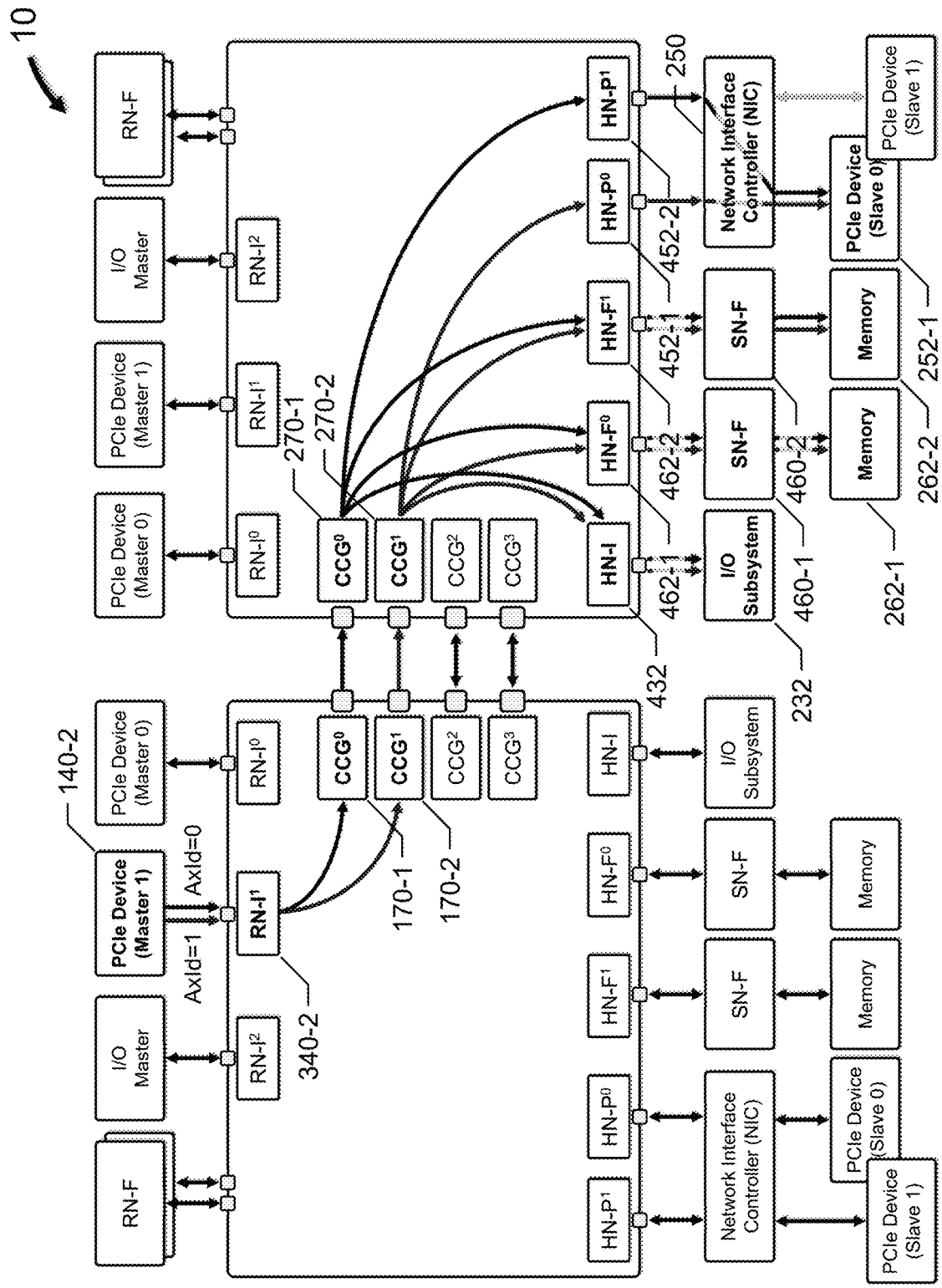
FIGS. 4A and 4B depict traffic flows through a system, according to an embodiment of the present disclosure.

FIG. 4A depicts AxId-based traffic flow through system 10, according to an embodiment of the present disclosure. While traffic is illustrated as flowing from chip 100 to chip 200, traffic may also flow from chip 200 to chip 100 in a similar manner.

In this example, PCIe master device 140-2 sends PCIe write transactions to RN-I 340-2 over an AXI bus. The PCIe write transactions include two PCIe write ordering streams with different AxIds, i.e., AxId=0 and AxId=1. RN-I 340-2 has an AxId-based hashed target group (HTG_AxId) that selects different CCIX targets for the different PCIe write ordering streams, such as the HTG_AxId depicted in FIG. 3A. RN-I 340-2 sends the first PCIe write ordering stream (i.e., PCIe write transactions with an AxId=0) to CCG 170-1, which transmits the PCIe write transactions over the CCIX link to CCG 270-1, which distributes the PCIe write transactions to the appropriate HN, such as HN-I 432, HN-F 462-1, HN-F 462-1 or HN-P 452-1. Similarly, RN-I 340-1 sends the second PCIe write ordering stream (i.e., PCIe write transactions with an AxId=1) to CCG 170-2, which transmits the PCIe write transactions over the CCIX link to CCG 270-2, which distributes the PCIe write transactions to the appropriate HN, i.e., HN-I 432, HN-F 462-1, HN-F 462-1 or HN-P 452-2. Furthermore, each PCIe ordering stream may select a different HN-P before targeting the same PCIe Slave device 252-1 via NIC 250.

Figure 4B:
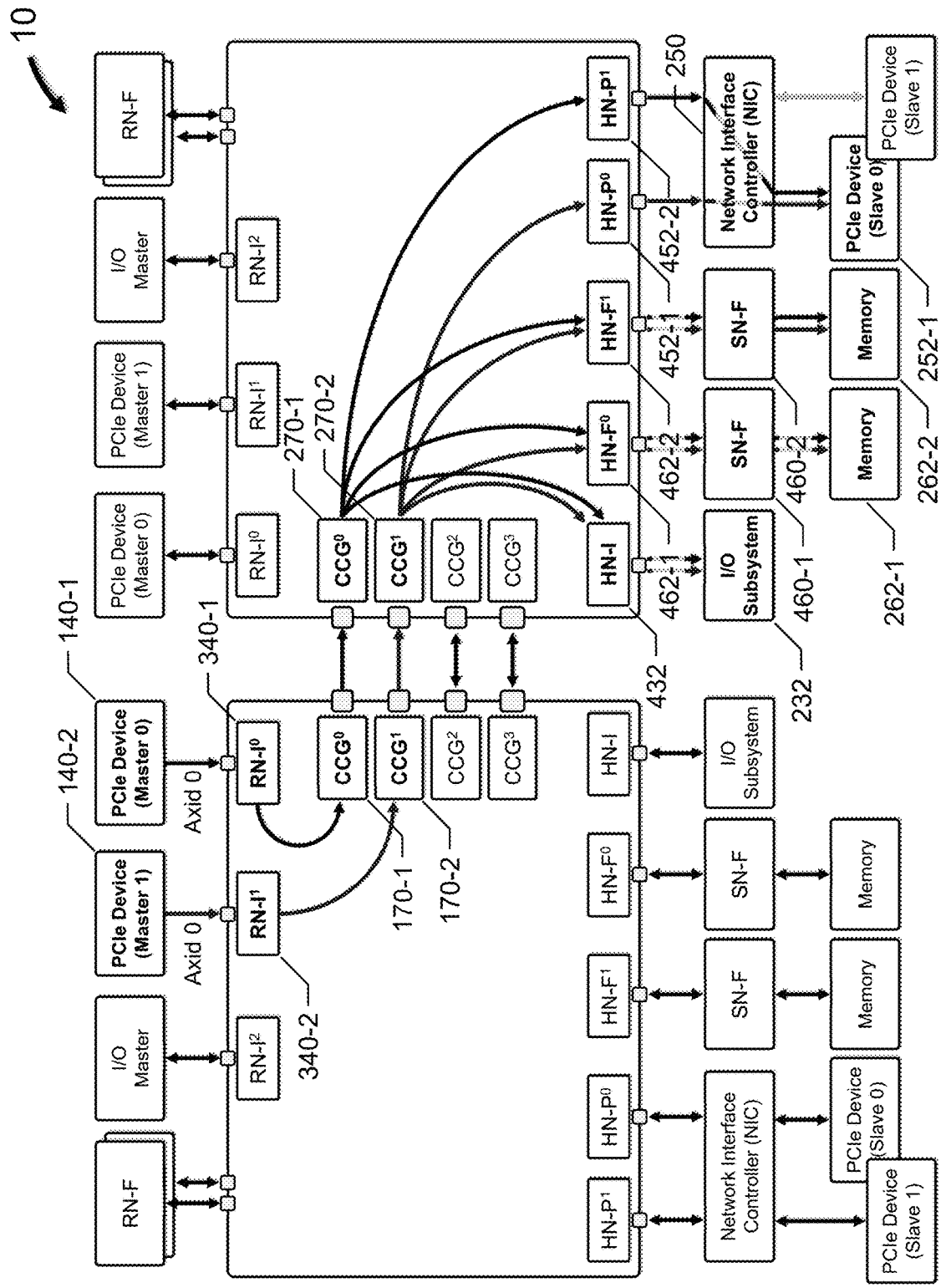

FIG. 4B depicts AxId-based traffic flow through system 10, according to an embodiment of the present disclosure. While traffic is illustrated as flowing from chip 100 to chip 200, traffic may also flow from chip 200 to chip 100 in a similar manner.

In this example, PCIe master device 140-1 sends PCIe write transactions to RN-I 340-1 over an AXI bus, and PCIe master device 140-2 sends PCIe write transactions to RN-I 340-2 over an AXI bus. The PCIe write transactions include two PCIe write ordering streams with the same AxIds, i.e., AxId=0. RN-I 340-1 has an AxId-based hashed target group (HTG_AxId) that selects different CCIX targets for different PCIe write ordering streams, such as the HTG_AxId associated with AxId-based target selection process 50 depicted in FIG. 3C. Similarly, RN-I 340-2 has an AxId-based hashed target group (HTG_AxId) that selects different CCIX targets for different PCIe write ordering streams, such as the HTG_AxId associated with AxId-based target selection process 51 depicted in FIG. 3C. As described above, AxId-based target selection process 50 selects $CCG^0$ when an AxId having a value of 0 is input, while AxId-based target selection process 51 selects $CCG^1$ when an AxId having a value of 0 is input. Selecting different CCGs produces better load balancing on the CCIX ports.

RN-I 340-1 sends the PCIe write ordering stream (i.e., PCIe write transactions with an AxId=0) to CCG 170-1 ($CCG^0$), which transmits the PCIe write transactions over the CCIX link to CCG 270-1 ($CCG^0$), which distributes the PCIe write transactions to the appropriate HN, such as HN-I 432, HN-F 462-1, HN-F 462-1 or HN-P 452-2. Similarly, RN-I 340-2 sends the PCIe write ordering stream (i.e., PCIe write transactions with an AxId=0) to CCG 170-2 ($CCG^1$), which transmits the PCIe write transactions over the CCIX link to CCG 270-2 ($CCG^1$), which distributes the PCIe write transactions to the appropriate HN, such as HN-I 432, HN-F 462-1, HN-F 462-1 or HN-P 452-1. Furthermore, each PCIe ordering stream may select a different HN-P before targeting the same PCIe Slave device 252-1 via NIC 250.

As mentioned above, AxId-based distribution may be used to control the association of PCIe master devices to CCIX ports in order to satisfy the particular bandwidth requirements of the PCIe master devices.

Figure 5A:
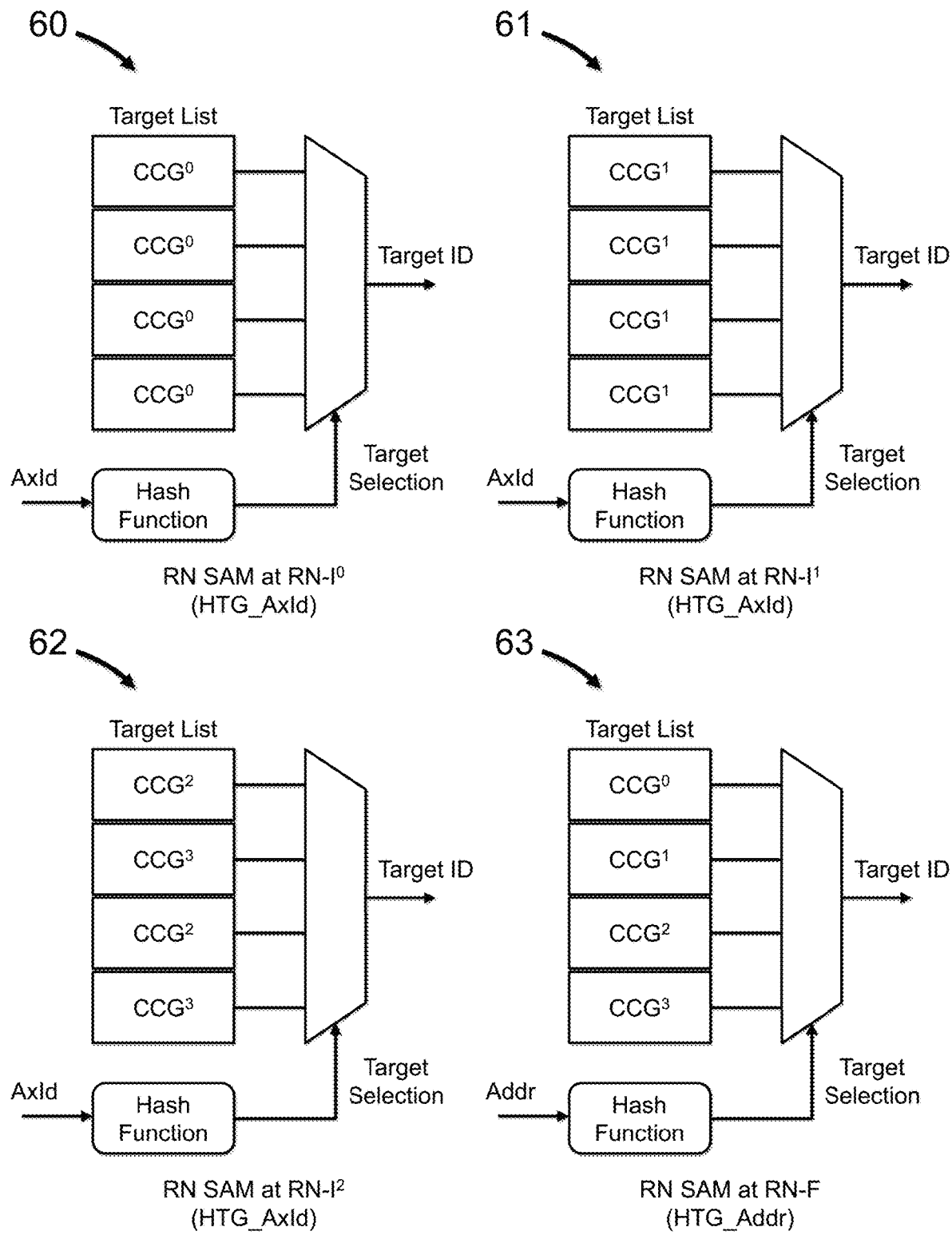
FIGS. 5A and 5C depict block diagrams of target selection processes, according to an embodiment of the present disclosure.

FIG. 5A depicts block diagrams of AxId-based target selection processes 60, 61 and 62 and address-based target selection process 63, according to an embodiment of the present disclosure.

In one embodiment, I/O master device 130 is a PCIe master device, and processor 120-1 is a CPU. PCIe master devices 140-1 and 140-2 have the same (x1) bandwidth requirement, I/O master device 130 has twice (x2) the bandwidth requirement of PCIe master devices 140-1 and 140-2, and processor 120-1 has twice (x2) the bandwidth requirement of I/O (PCIe) master device 130. In this embodiment, AxId-based distribution is advantageously combined with address-based distribution to support the bandwidth requirements of not only the PCIe master devices but also the CPU.

RN-I 340-1 (RN-$I^0$) distributes traffic to a single CCG (i.e., $CCG^0$). RN-I 340-2 (i.e., RN-$I^1$) distributes traffic to a single CCG (i.e., $CCG^1$). RN-I 330 (i.e., RN-$I^2$) distributes traffic across 2 CCGs (i.e., $CCG^2$, $CCG^3$) using AxId-based distribution. RN-F 320-1 distributes traffic across 4 CCGs (i.e., $CCG^0$, $CCG^1$, $CCG^2$, $CCG^3$) using address-based distribution.

With respect to AxId-based target selection process 60, the AxId is provided as the input to the hash function, which outputs a hash value such as, for example, 0, 1, 2 or 3; other output values are also contemplated. The hash value is then used to select a target from the target list, i.e., a hash value of 0 selects $CCG^0$, a hash value of 1 selects $CCG^0$, a hash value of 2 selects $CCG^0$, and a hash value of 3 selects $CCG^0$; in other words, all of the hash values select the same CCG. The selected $CCG^0$ is output as the target ID.

With respect to AxId-based target selection process 61, the AxId is provided as the input to the hash function, which outputs a hash value such as, for example, 0, 1, 2 or 3; other output values are also contemplated. The hash value is then used to select a target from the target list, i.e., a hash value of 0 selects $CCG^1$, a hash value of 1 selects $CCG^1$, a hash value of 2 selects $CCG^1$, and a hash value of 3 selects $CCG^1$; in other words, all of the hash values select the same CCG. The selected $CCG^1$ is output as the target ID.

With respect to AxId-based target selection process 62, the AxId is provided as the input to the hash function, which outputs a hash value such as, for example, 0, 1, 2 or 3; other output values are also contemplated. The hash value is then used to select a target from the target list, i.e., a hash value of 0 selects $CCG^2$, a hash value of 1 selects $CCG^3$, a hash value of 2 selects $CCG^2$, and a hash value of 3 selects $CCG^3$; in other words, all of the hash values select either $CCG^2$ or $CCG^3$. The selected $CCG^2$ or $CCG^3$ is output as the target ID.

With respect to address-based target selection process 63, the address (i.e., addr) is provided as the input to the hash function, which outputs a hash value such as, for example, 0, 1, 2 or 3; other output values are also contemplated. The hash value is then used to select a target from the target list, i.e., a hash value of 0 selects $CCG^0$, a hash value of 1 selects $CCG^1$, a hash value of 2 selects $CCG^2$, and a hash value of 3 selects $CCG^3$. The selected $CCG^0$, $CCG^1$, $CCG^2$ or $CCG^3$ is output as the target ID.

Figure 5B:
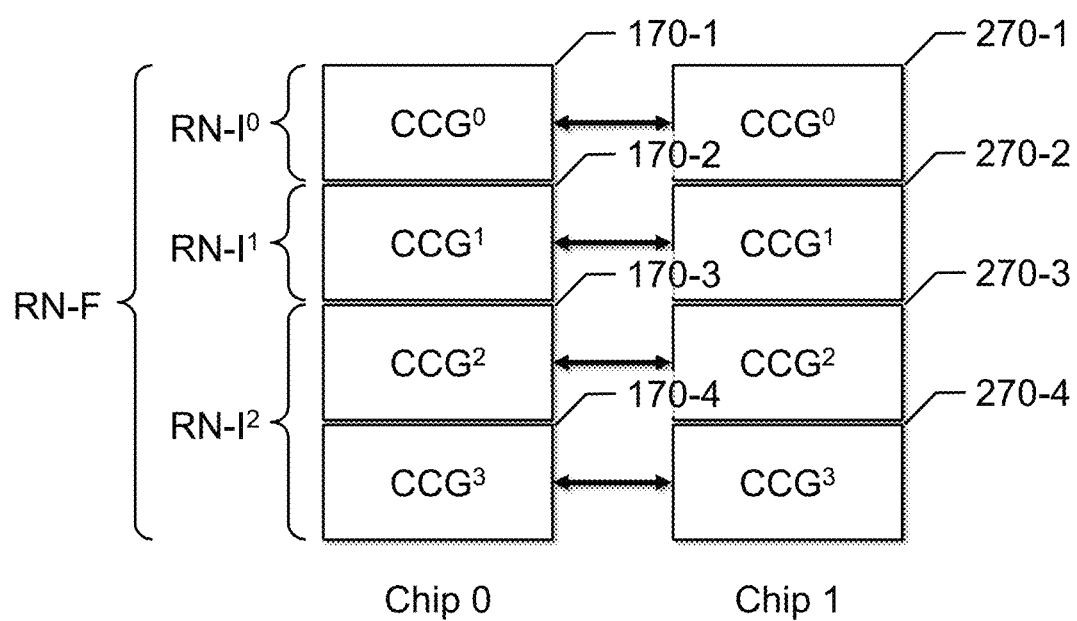
FIGS. 5B and 5D depict traffic distributions at the CCGs, according to an embodiment of the present disclosure.

FIG. 5B depicts traffic distribution 64 at the CCGs, according to an embodiment of the present disclosure. Each $CCG^1$ is associated with RN-F 320-1 as well as one RN-$I^1$ (i.e., RN-$I^0$, RN-$I^1$ or RN-$I^2$).

Figure 6A:
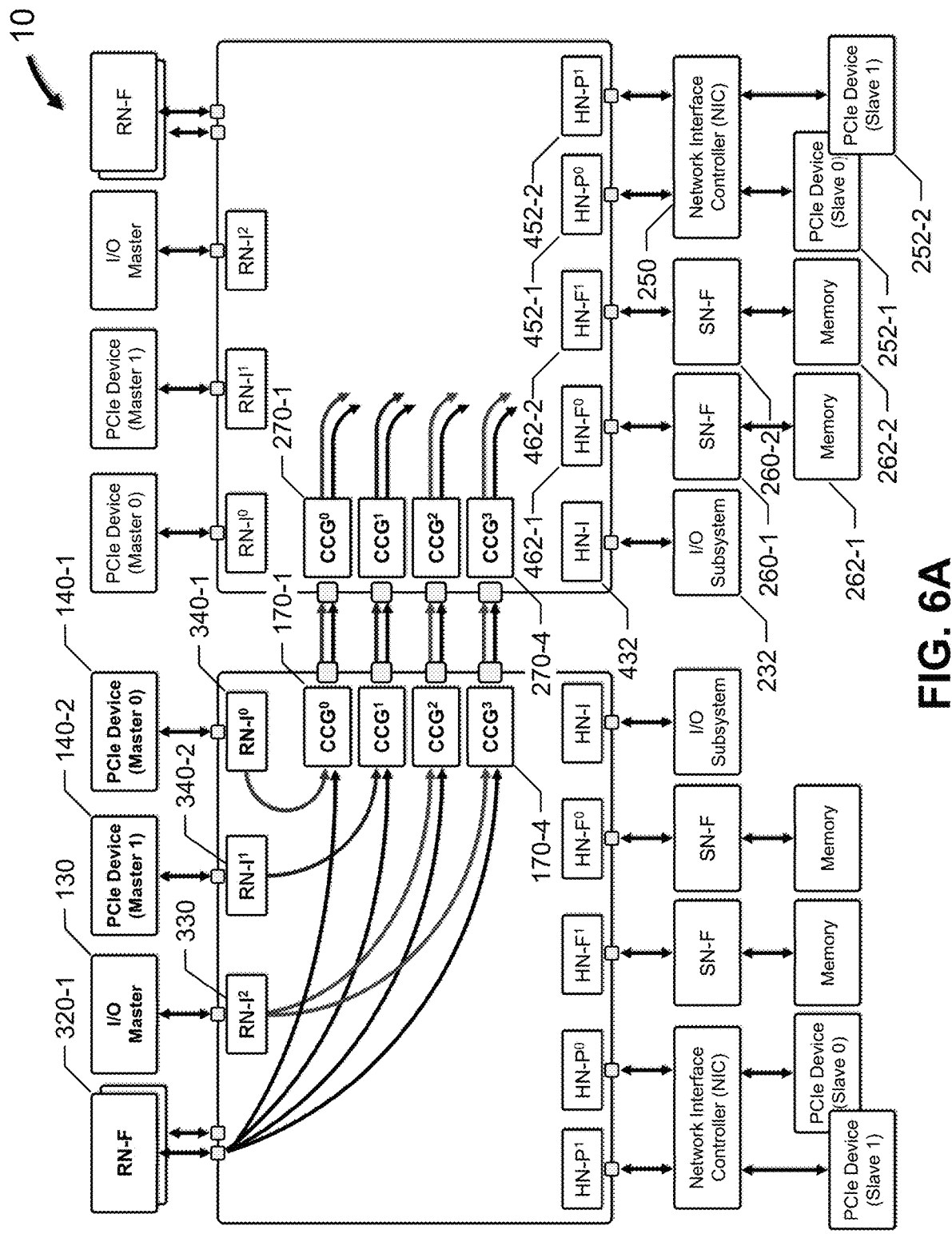
FIGS. 6A and 6B depict traffic flows through a system, according to an embodiment of the present disclosure.

FIG. 6A depicts traffic flow through system 10, according to an embodiment of the present disclosure. While traffic is illustrated as flowing from chip 100 to chip 200, traffic may also flow from chip 200 to chip 100 in a similar manner.

In this embodiment, I/O master device 130 is a PCIe master device, processor 120-1 is a CPU, and the bandwidth distribution described with respect to FIGS. 5A and 5B is programmed into RN-F 320-1, RN-I 330, RN-I 340-1 and RN-I 340-2. PCIe master device 140-1 originates and sends PCIe transactions to RN-I 340-1 over an AXI bus, PCIe master device 140-2 originates and sends PCIe transactions to RN-I 340-2 over an AXI bus, I/O (PCIe) master device 130 originates and sends PCIe transactions to RN-I 330 over an AXI bus, and processor 120-1, acting as RN-F 320-1, originates transactions directed to the resources of chip 200.

RN-I 340-1 has an AxId-based hashed target group (HTG_AxId) that selects the same CCIX target (i.e., $CCG^0$) for each hash value. RN-I 340-2 has an AxId-based hashed target group (HTG_AxId) that selects the same CCIX target (i.e., $CCG^1$) for each hash value. RN-I 330 has an AxId-based hashed target group (HTG_AxId) that selects one of two CCIX targets (i.e., $CCG^2$ or $CCG^3$) based the hash value. RN-F 320-1 has an address-based hashed target group (HTG_Addr) that selects one of four CCIX targets (i.e., $CCG^0$, $CCG^1$, $CCG^2$ or $CCG^3$) based the hash value.

RN-I 340-1 sends the PCIe transactions to CCG 170-1, which transmits the PCIe transactions over the CCIX link to CCG 270-1, which distributes the PCIe transactions to the appropriate HN, such as HN-I 432, HN-F 462-1, HN-F 462-1, HN-P 452-1 or HN-P 452-2. RN-I 340-2 sends the PCIe transactions to CCG 170-2, which transmits the PCIe transactions over the CCIX link to CCG 270-2, which distributes the PCIe transactions to the appropriate HN, such as HN-I 432, HN-F 462-1, HN-F 462-1, HN-P 452-1 or HN-P 452-2. RN-I 330 sends the PCIe transactions to CCG 170-2 or CCG 170-3, which transmits the PCIe transactions over the CCIX link to CCG 270-2 or CCG 270-3, which distribute the PCIe transactions to the appropriate HN, such as HN-I 432, HN-F 462-1, HN-F 462-1, HN-P 452-1 or HN-P 452-2. RN-F 320-1 sends the transactions to CCG 170-1, CCG 170-2, CCG 170-3 or CCG 170-4, which transmits the PCIe transactions over the CCIX link to CCG 270-1, CCG 270-2, CCG 270-3 or CCG 270-4 (respectively), which distribute the transactions to the appropriate HN, such as HN-I 432, HN-F 462-1, HN-F 462-1, HN-P 452-1 or HN-P 452-2.

To achieve even better performance, additional CCGs may be added to system 10 to isolate the traffic between processor 120-1, I/O master device 130, PCIe master device 140-1 and PCIe master device 140-2.

Figure 6B:
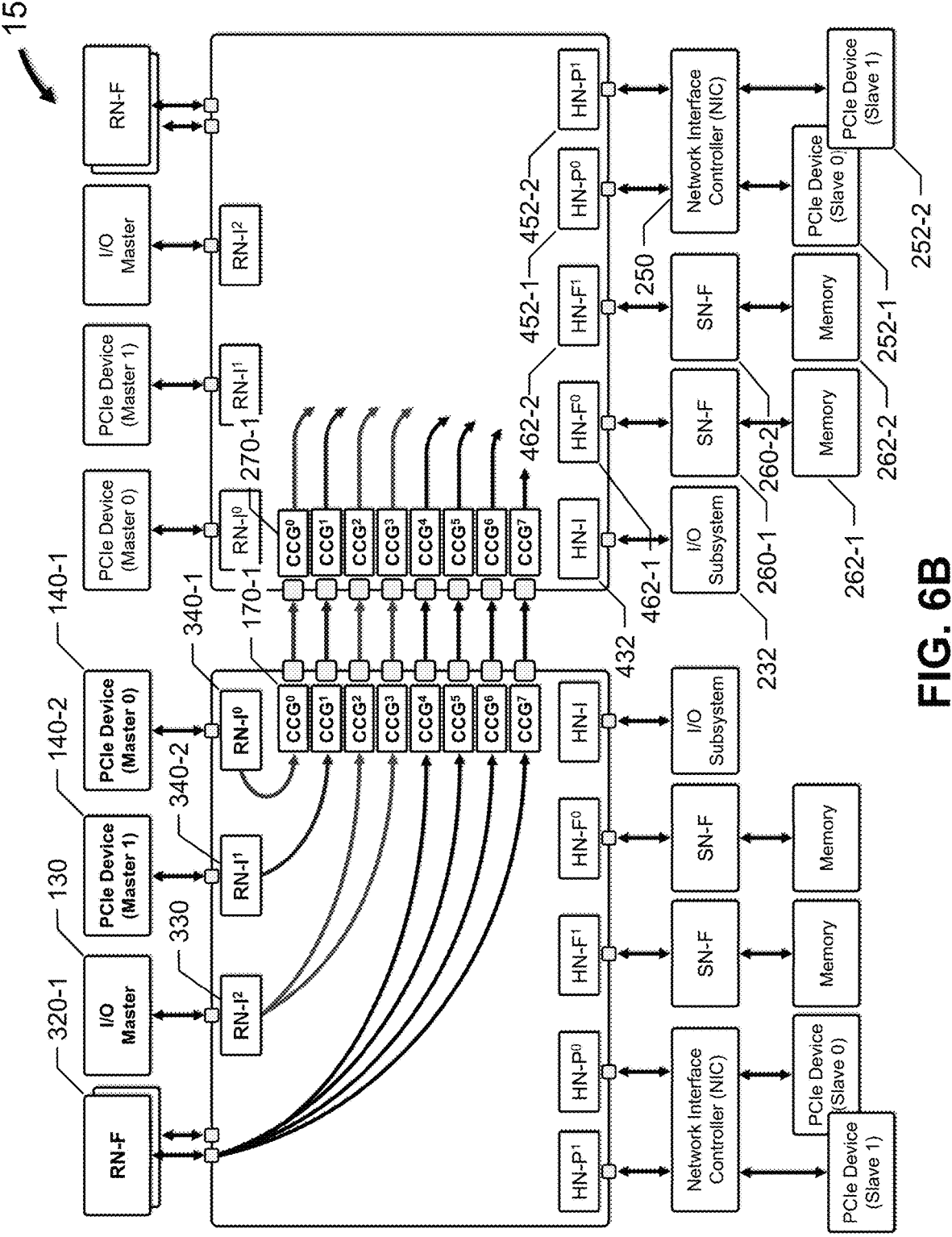

FIG. 6B depicts traffic flow through system 15, according to an embodiment of the present disclosure. While traffic is illustrated as flowing from chip 100 to chip 200, traffic may also flow from chip 200 to chip 100 in a similar manner.

In this embodiment, I/O master device 130 is a PCIe master device, processor 120-1 is a CPU, and the bandwidth distribution described with respect to FIGS. 5C and 5D (discussed below) is programmed into RN-F 320-1, RN-I 330, RN-I 340-1 and RN-I 340-2. PCIe master device 140-1 originates and sends PCIe transactions to RN-I 340-1 over an AXI bus, PCIe master device 140-2 originates and sends PCIe transactions to RN-I 340-2 over an AXI bus, I/O (PCIe) master device 130 originates and sends PCIe transactions to RN-I 330 over an AXI bus, and processor 120-1, acting as RN-F 320-1, originates transactions directed to the resources of chip 200.

Figure 5C:
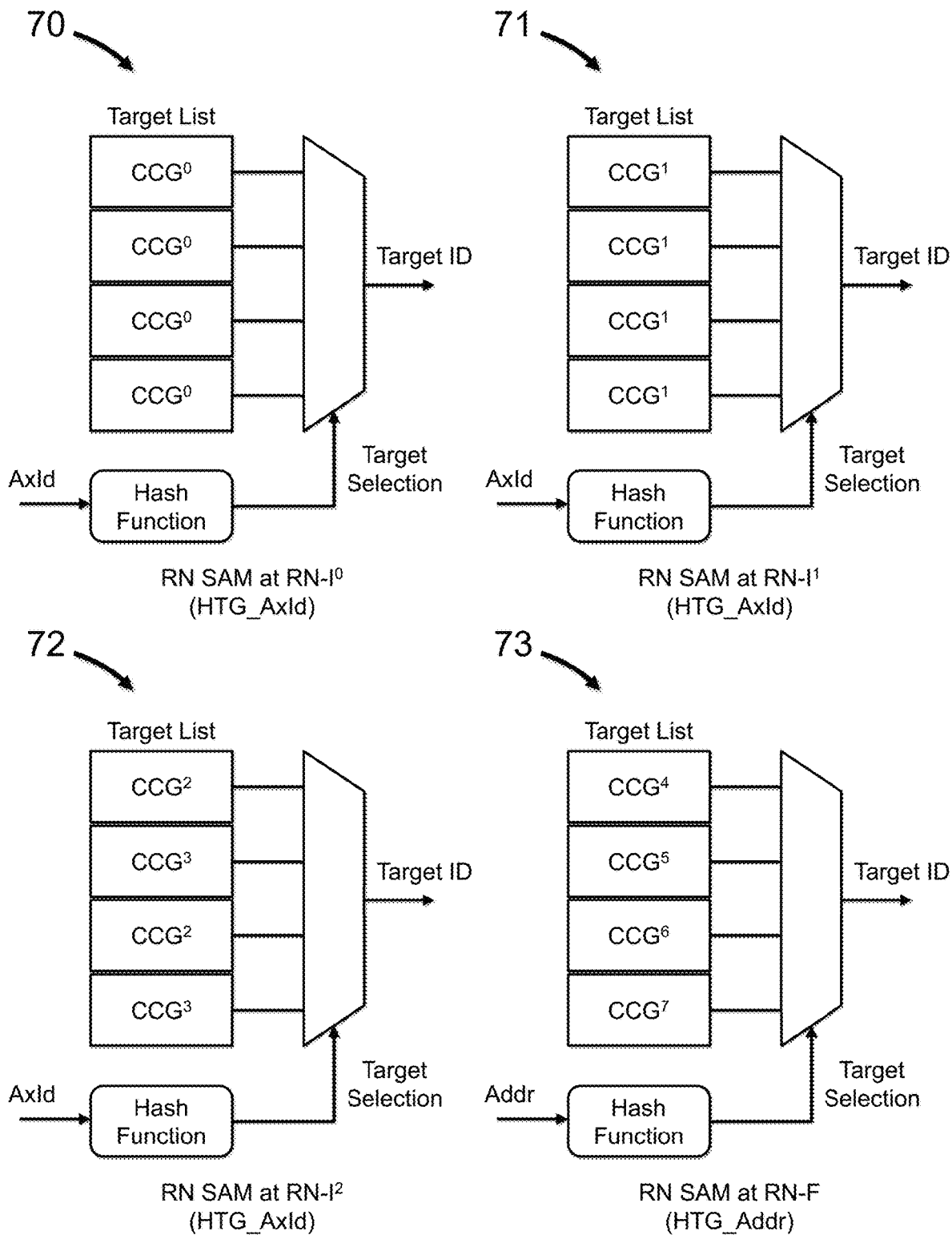

FIG. 5C depicts block diagrams of AxId-based target selection processes 70, 71 and 72 and address-based target selection process 73, according to an embodiment of the present disclosure. AxId-based target selection processes 70, 71 and 72 are the same as AxId-based target selection processes 60, 61 and 62. Address-based target selection process 73 is generally the same as address-based target selection process 63 with the substitution of $CCG^4$, $CCG^5$, $CCG^6$ and $CCG^7$ for $CCG^0$, $CCG^1$, $CCG^2$ and $CCG^3$, respectively.

Figure 5D:
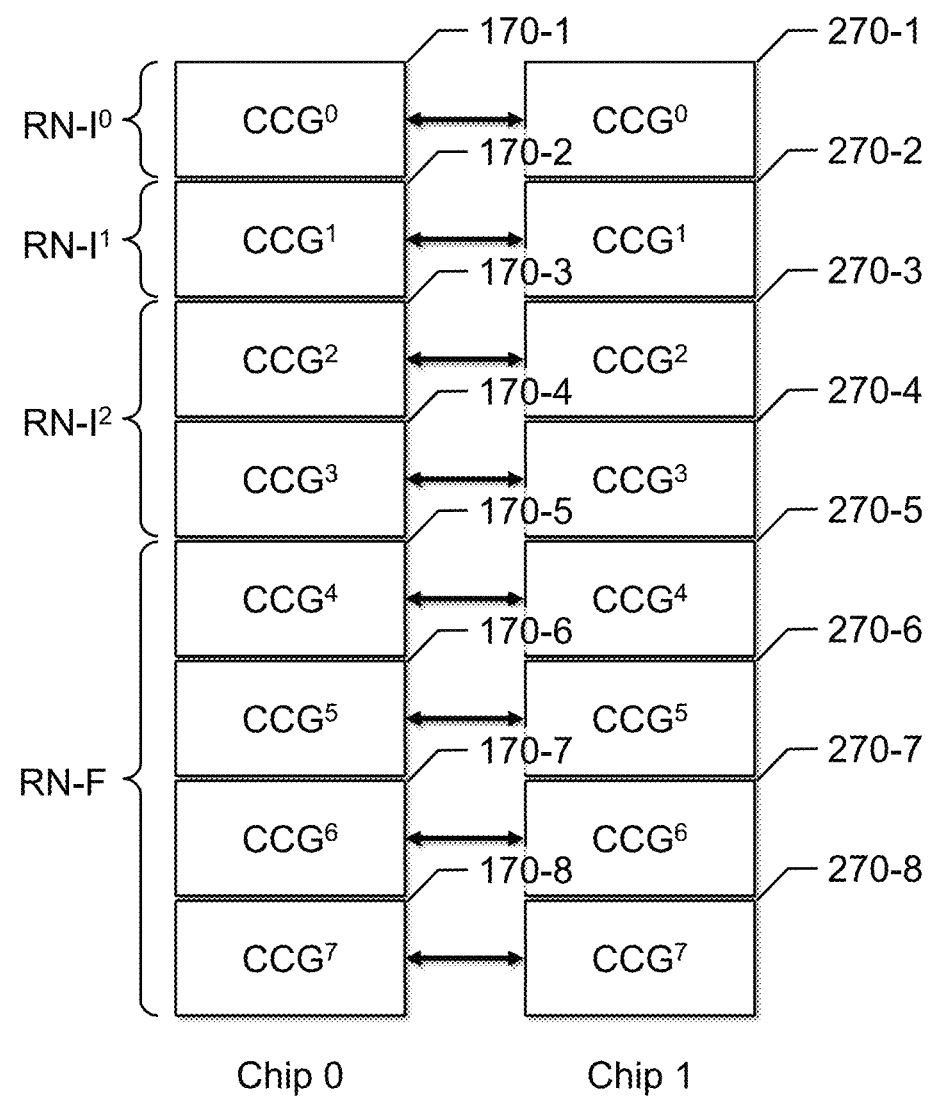

FIG. 5D depicts traffic distribution 74 at the CCGs, according to an embodiment of the present disclosure. Each $CCG^i$ is associated with a single RN, i.e., RN-F 320-1, RN-$I^0$, RN-$I^1$ or RN-$I^2$.

Referring back to FIG. 6B, RN-I 340-1 has an AxId-based hashed target group (HTG_AxId) that selects the same CCIX target (i.e., $CCG^0$) for each hash value. RN-I 340-2 has an AxId-based hashed target group (HTG_AxId) that selects the same CCIX target (i.e., $CCG^1$) for each hash value. RN-I 330 has an AxId-based hashed target group (HTG_AxId) that selects one of two CCIX targets (i.e., $CCG^2$ or $CCG^3$) based the hash value. RN-F 320-1 has an address-based hashed target group (HTG_Addr) that selects one of four CCIX targets (i.e., $CCG^4$, $CCG^5$, $CCG^6$ or $CCG^7$) based the hash value.

RN-I 340-1 sends the PCIe transactions to CCG 170-1, which transmits the PCIe transactions over the CCIX link to CCG 270-1, which distributes the PCIe transactions to the appropriate HN, such as HN-I 432, HN-F 462-1, HN-F 462-1, HN-P 452-1 or HN-P 452-2. RN-I 340-2 sends the PCIe transactions to CCG 170-2, which transmits the PCIe transactions over the CCIX link to CCG 270-2, which distributes the PCIe transactions to the appropriate HN, such as HN-I 432, HN-F 462-1, HN-F 462-1, HN-P 452-1 or HN-P 452-2. RN-I 330 sends the PCIe transactions to CCG 170-2 or CCG 170-3, which transmits the PCIe transactions over the CCIX link to CCG 270-2 or CCG 270-3, which distribute the PCIe transactions to the appropriate HN, such as HN-I 432, HN-F 462-1, HN-F 462-1, HN-P 452-1 or HN-P 452-2. RN-F 320-1 sends the transactions to CCG 170-5, CCG 170-6, CCG 170-7 or CCG 170-8, which transmits the PCIe transactions over the CCIX link to CCG 270-5, CCG 270-6, CCG 270-7 or CCG 270-8 (respectively), which distribute the transactions to the appropriate HN, such as HN-I 432, HN-F 462-1, HN-F 462-1, HN-P 452-1 or HN-P 452-2.

Figure 7:
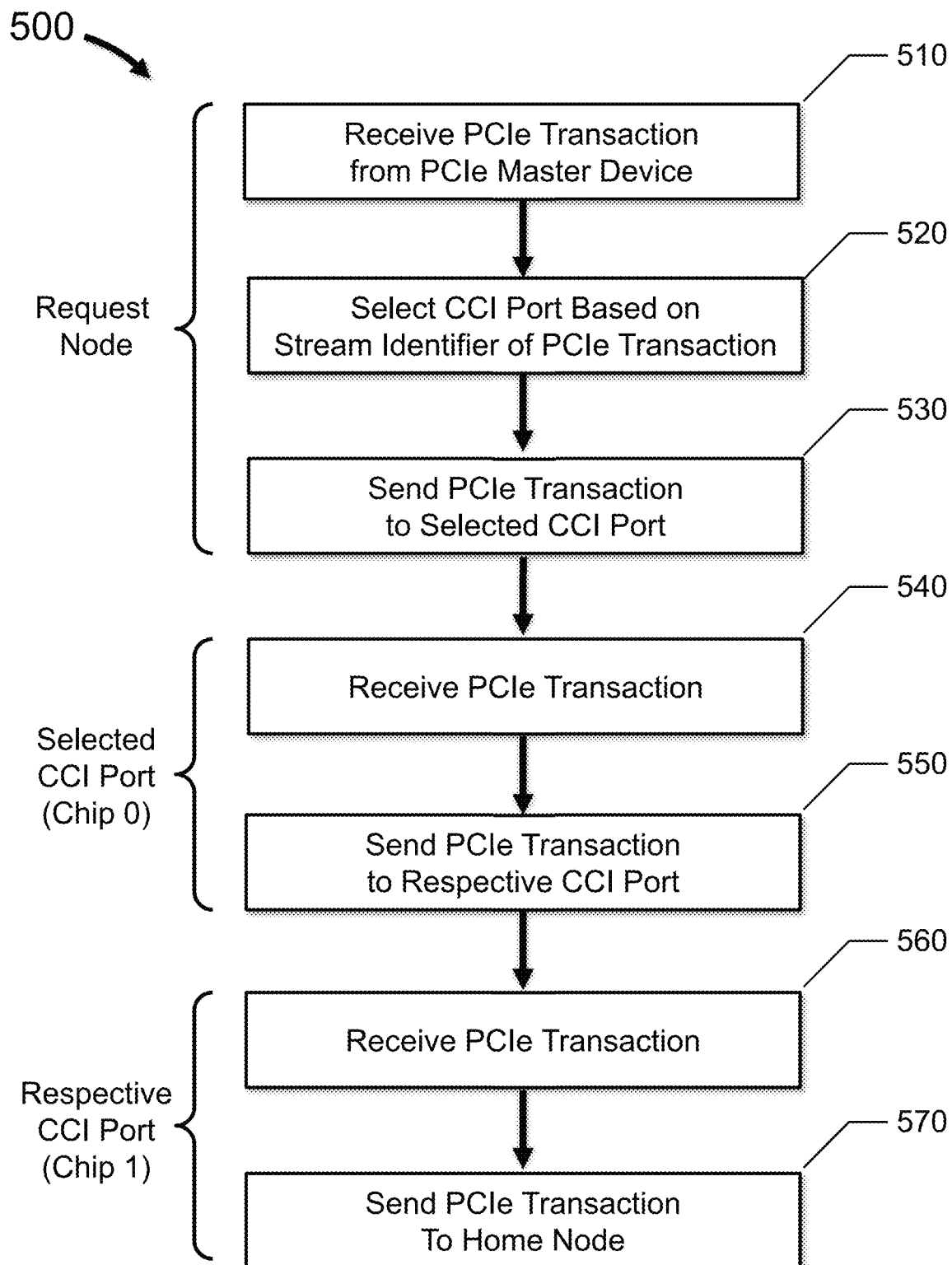
FIG. 7 depicts a flow diagram representing functionality associated with transferring data over a CCI, in accordance with embodiments of the present disclosure.

FIG. 7 depicts a flow diagram 500 representing functionality associated with transferring data over a CCI, in accordance with embodiments of the present disclosure.

The functionality at 510, 520 and 530 is performed at a request node (e.g., RN-I 340-1, RN-I 340-2, etc.) of coherent interconnect 110 of chip 100, the functionality at 540 and 550 is performed at a CCI port (e.g., a CCG 170) of coherent interconnect 110, and the functionality at 560 and 570 is performed at a CCI port (e.g., a CCG 270) of coherent interconnect 210 of chip 200.

At 510, at least one PCIe transaction is received from a PCIe master device 140. The PCIe transaction includes a stream identifier, such as, for example, an AxId.

At 520, a CCI port (e.g., CCG 170) of coherent interconnect 110 of chip 100 is selected based on the stream identifier of the PCIe transaction.

At 530, the PCIe transaction is sent to the selected CCI port (e.g., the selected CCG 170).

At 540, the PCIe transaction is received.

At 550, the PCIe transaction is sent to a respective CCI port (e.g., a respective CCG 270) of coherent interconnect 210 of chip 200.

At 560, the PCIe transaction is received.

At 570, the PCIe transaction is sent to a home node of coherent interconnect 210 of chip 200.

In one embodiment, a method for transferring data over a CCI includes, at a request node of a CHI of a first chip, receiving at least one PCIe transaction from a PCIe master device, the PCIe transaction including a stream identifier; selecting a CCI port of the CHI of the first chip based on the stream identifier of the PCIe transaction; and sending the PCIe transaction to the selected CCI port.

In another embodiment of the method, the request node receives the PCIe transaction over an advanced extensible interface (AXI); and the stream identifier is an AxId.

In another embodiment of the method, the method further includes, at the selected CCI port, receiving the PCIe transaction; and sending the PCIe transaction to a respective CCI port of a CHI of a second chip.

In another embodiment of the method, the method further includes, at the respective CCI port of the CHI of the second chip, receiving the PCIe transaction; and sending the PCIe transaction to a home node of the CHI of the second chip.

In another embodiment of the method, the request node receives a first PCIe transaction and a second PCIe transaction, the first PCIe transaction has a first stream identifier, and the second PCIe transaction has a second stream identifier that is different than the first stream identifier; a first CCI port is selected based on the first stream identifier of the first PCIe transaction; a second CCI port is selected based on the second stream identifier of the second PCIe transaction, the second selected CCI port is different than first selected CCI port; the first PCIe transaction is sent to the selected first CCI port; and the second PCIe transaction is sent to the selected second CCI port.

In another embodiment of the method, the method further includes, at the selected first CCI port, receiving the first PCIe transaction, and sending the first PCIe transaction to a respective first CCI port of the CHI of the second chip; at the selected second CCI port, receiving the second PCIe transaction, and sending the second PCIe transaction to a respective second CCI port of the CHI of the second chip; at the respective first CCI port of the CHI of the second chip, receiving the first PCIe transaction, and sending the first PCIe transaction to a first home node of the CHI of the second chip; and, at the respective second CCI port of the CHI of the second chip, receiving the second PCIe transaction, and sending the second PCIe transaction to the first home node or a second home node of the CHI of the second chip.

In another embodiment of the method, the method further comprises, at an additional request node of the CHI of the first chip, receiving at least one additional PCIe transaction from an additional PCIe master device, the additional PCIe transaction including a stream identifier that is the same as the stream identifier of the PCIe transaction; selecting an additional CCI port of the CHI of the first chip based on the stream identifier of the additional PCIe transaction, the additional selected CCI port being different than the selected CCI port; and sending the additional PCIe transaction to the additional selected CCI port.

In another embodiment of the method, the method further comprises, at the additional selected CCI port, receiving the additional PCIe transaction, and sending the additional PCIe transaction to an additional respective CCI port of the CHI of the second chip; and, at the additional respective CCI port of the CHI of the second chip, receiving the additional PCIe transaction, and sending the additional PCIe transaction to the home node or an additional home node of the CHI of the second chip.

In another embodiment of the method, the method further comprises, at a fully-coherent request node of the CHI of the first chip, generating at least one transaction, the transaction including an address on a second chip; selecting a CCI port of the CHI of the first chip based on the address of the transaction; and sending the transaction to the selected CCI port.

In another embodiment of the method, the CCI port selected by the fully coherent request node is different than the CCI port selected by the request node.

In another embodiment of the method, the CHI of the first chip includes a plurality of request nodes and a plurality of CCI ports; and each request node has a number of different selectable CCI ports that is based on a bandwidth requirement of the request node.

In one embodiment, a system includes a PCIe master device, a first chip including a first CHI, and a second chip including a second CHI. The first CHI includes at least one request node coupled to the PCIe master device, and a plurality of CCI ports. The second CHI includes at least one home node, and a plurality of CCI ports, each CCI port coupled to a respective CCI port of the first CHI. The request node is configured to receive at least one PCIe transaction from the PCIe master device, select a CCI port of the first CHI based on a stream identifier of the PCIe transaction, and send the PCIe transaction to the selected CCI port. The selected CCI port is configured to receive the PCIe transaction, and send the PCIe transaction to a respective CCI port of the second CHI.

In another embodiment of the system, the request node receives the PCIe transaction over an advanced extensible interface (AXI); and the stream identifier is an AxId.

In another embodiment of the system, the respective CCI port of the second CHI is configured to receive the PCIe transaction, and send the PCIe transaction to the home node.

In another embodiment of the system, the request node receives a first PCIe transaction and a second PCIe transaction, the first PCIe transaction has a first stream identifier, and the second PCIe transaction has a second stream identifier that is different than the first stream identifier; a first CCI port is selected based on the first stream identifier of the first PCIe transaction; a second CCI port is selected based on the second stream identifier of the second PCIe transaction, the second selected CCI port is different than first selected CCI port; the first PCIe transaction is sent to the selected first CCI port; and the second PCIe transaction is sent to the selected second CCI port.

In another embodiment of the system, the selected first CCI port is configured to receive the first PCIe transaction, and send the first PCIe transaction to a respective first CCI port of the second CHI; the selected second CCI port is configured to receive the second PCIe transaction, and send the second PCIe transaction to a respective second CCI port of the second CHI; the respective first CCI port of the second CHI is configured to receive the first PCIe transaction, and send the first PCIe transaction to a first home node; and, the respective second CCI port of the second CHI is configured to receive the second PCIe transaction, and send the second PCIe transaction to the first home node or a second home node.

In another embodiment of the system, an additional request node of the first CHI is configured to receive at least one additional PCIe transaction from an additional PCIe master device, the additional PCIe transaction including a stream identifier that is the same as the stream identifier of the PCIe transaction; select an additional CCI port of the first CHI based on the stream identifier of the additional PCIe transaction, the additional selected CCI port being different than the selected CCI port; and send the additional PCIe transaction to the additional selected CCI port.

In another embodiment of the system, the additional selected CCI port is configured to receive the additional PCIe transaction, and send the additional PCIe transaction to an additional respective CCI port of the second CHI; and, the additional respective CCI port of the second CHI is configured to receive the additional PCIe transaction, and send the additional PCIe transaction to the home node or an additional home node of the second CHI.

In another embodiment of the system, a fully-coherent request node of the first CHI is configured to generate at least one transaction, the transaction including an address on the second chip; select a CCI port of the first CHI based on the address of the transaction; and send the transaction to the selected CCI port.

In another embodiment of the system, the CCI port selected by the fully coherent request node is different than the CCI port selected by the request node.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, the terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "many embodiment," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for distributing data over a chip-to-chip interconnect (CCI), comprising:
   at a request node of a coherent interconnect (CHI) of a first chip, the CHI having a coherent protocol:
   receiving at least one peripheral component interface express (PCIe) transaction from a PCIe master device, each PCIe transaction including a stream identifier of the PCIe transaction;
   for each PCIe transaction, selecting a CCI port of the CHI based on the stream identifier of the PCIe transaction, in accordance with PCIe ordering rules; and
   sending the PCIe transaction to the selected CCI port using a PCIe protocol that is not the coherent protocol of the CHI.

2. The method according to claim 1, where:
   the request node receives the PCIe transaction over an advanced extensible interface (AXI); and
   the stream identifier is an AxId.

3. The method according to claim 1, further comprising:
   at the selected CCI port:
   receiving the PCIe transaction; and
   sending the PCIe transaction to a respective CCI port of a CHI of a second chip.

4. The method according to claim 3, further comprising:
   at the respective CCI port of the CHI of the second chip:
   receiving the PCIe transaction; and
   sending the PCIe transaction to a home node of the CHI of the second chip.

5. The method according to claim 4, where:
   the request node receives a first PCIe transaction and a second PCIe transaction, the first PCIe transaction has a first stream identifier, and the second PCIe transaction has a second stream identifier that is different than the first stream identifier;
   a first CCI port is selected based on the first stream identifier of the first PCIe transaction;
   a second CCI port is selected based on the second stream identifier of the second PCIe transaction, the second selected CCI port is different than first selected CCI port;
   the first PCIe transaction is sent to the selected first CCI port; and
   the second PCIe transaction is sent to the selected second CCI port.

6. The method according to claim 5, further comprising:
at the selected first CCI port:
  receiving the first PCIe transaction;
  sending the first PCIe transaction to a respective first CCI port of the CHI of the second chip;
at the selected second CCI port:
  receiving the second PCIe transaction;
  sending the second PCIe transaction to a respective second CCI port of the CHI of the second chip;
at the respective first CCI port of the CHI of the second chip:
  receiving the first PCIe transaction;
  sending the first PCIe transaction to a first home node of the CHI of the second chip;
at the respective second CCI port of the CHI of the second chip:
  receiving the second PCIe transaction; and
  sending the second PCIe transaction to the first home node or a second home node of the CHI of the second chip.

7. The method according to claim 4, further comprising:
at an additional request node of the CHI of the first chip:
  receiving at least one additional PCIe transaction from an additional PCIe master device, the at least one additional PCIe transaction including a stream identifier that is the same as the stream identifier of the PCIe transaction;
  selecting at least one additional CCI port of the CHI of the first chip based on the stream identifier of the at least one additional PCIe transaction, the at least one additional selected CCI port being different than the selected CCI port; and
  sending the at least one additional PCIe transaction to the at least one additional selected CCI port.

8. The method according to claim 7, further comprising:
at the at least one additional selected CCI port:
  receiving the at least one additional PCIe transaction;
  sending the at least one additional PCIe transaction to mat least one additional respective CCI port of the CHI of the second chip;
at the at least one additional respective CCI port of the CHI of the second chip:
  receiving the at least one additional PCIe transaction; and
  sending the at least one additional PCIe transaction to the home node or at least one additional home node of the CHI of the second chip.

9. The method according to claim 1, further comprising:
at a fully-coherent request node of the CHI of the first chip:
  generating at least one transaction, the transaction including an address on a second chip;
  selecting a CCI port of the CHI of the first chip based on the address of the transaction; and
  sending the transaction to the selected CCI port.

10. The method according to claim 9, where the CCI port selected by the fully-coherent request node is different than the CCI port selected by the request node.

11. The method according to claim 1, where:
the CHI of the first chip includes a plurality of request nodes and a plurality of CCI ports; and
each request node has a number of different selectable CCI ports that is based on a bandwidth requirement of the request node.

12. A system, comprising:
a peripheral component interface express (PCIe) master device;
a first chip including a first coherent interconnect (CHI), the first CHI including:
  at least one request node coupled to the PCIe master device by a PCIe protocol, and
  a plurality of chip-to-chip interconnect (CCI) ports; and
a second chip including a second CHI, the second CHI including:
  at least one home node, and
  a plurality of CCI ports, each CCI port coupled to a respective CCI port of the first CHI by a coherent protocol that is not the PCIe protocol of the CHI,
where the request node is configured to receive at least one PCIe transaction from the PCIe master device, distribute PCIe data traffic in accordance with PCIe ordering rules by selection of a CCI port of the first CHI based on a stream identifier of the PCIe transaction, and send the PCIe transaction to the selected CCI port using the PCIe protocol, and
where the selected CCI port is configured to receive the PCIe transaction, and send the PCIe transaction to a respective CCI port of the second CHI using the coherent protocol.

13. The system according to claim 12, where:
the request node receives the PCIe transaction over an advanced extensible interface (AXI); and
the stream identifier is an AxId.

14. The system according to claim 12, where the respective CCI port of the second CHI is configured to receive the PCIe transaction, and send the PCIe transaction to the home node.

15. The system according to claim 14, where:
the request node receives a first PCIe transaction and a second PCIe transaction, the first PCIe transaction has a first stream identifier, and the second PCIe transaction has a second stream identifier that is different than the first stream identifier;
a first CCI port is selected based on the first stream identifier of the first PCIe transaction;
a second CCI port is selected based on the second stream identifier of the second PCIe transaction, and the second selected CCI port is different than the first selected CCI port;
the first PCIe transaction is sent to the selected first CCI port; and
the second PCIe transaction is sent to the selected second CCI port.

16. The system according to claim 15, where:
the selected first CCI port is configured to:
  receive the first PCIe transaction;
  send the first PCIe transaction to a respective first CCI port of the second CHI;
the selected second CCI port is configured to:
  receive the second PCIe transaction;
  send the second PCIe transaction to a respective second CCI port of the second CHI;
the respective first CCI port of the second CHI is configured to:
  receive the first PCIe transaction;
  send the first PCIe transaction to a first home node;
the respective second CCI port of the second CHI is configured to:
  receive the second PCIe transaction; and
  send the second PCIe transaction to the first home node or a second home node.

17. The system according to claim 14, where:
an additional request node of the first CHI is configured to:

receive at least one additional PCIe transaction from an additional PCIe master device, the at least one additional PCIe transaction including a stream identifier that is the same as the stream identifier of the PCIe transaction;

select at least one additional CCI port of the first CHI based on the stream identifier of the at least one additional PCIe transaction, the at least one additional selected CCI port being different than the selected CCI port; and send the at least one additional PCIe transaction to the at least one additional selected CCI port.

18. The system according to claim 17, where:

the at least one additional selected CCI port is configured to:

receive the at least one additional PCIe transaction;

send the at least one additional PCIe transaction to at least one additional respective CCI port of the second CHI;

the at least one additional respective CCI port of the second CHI is configured to:

receive the at least one additional PCIe transaction; and send the at least one additional PCIe transaction to the home node or at least one additional home node of the second CHI.

19. The system according to claim 12, where:

a fully-coherent request node of the first CHI is configured to:

generate at least one transaction, the transaction including an address on the second chip;

select a CCI port of the first CHI based on the address of the transaction; and send the transaction to the selected CCI port.

20. The system according to claim 19, where the CCI port selected by the fully-coherent request node is different than the CCI port selected by the request node.

* * * * *